(12) United States Patent
Basilice et al.

(10) Patent No.: US 12,155,652 B2
(45) Date of Patent: Nov. 26, 2024

(54) UNIVERSAL AUTHENTICATOR APPARATUS FOR OBTAINING HOST SERVICES

(71) Applicant: I IDEAS LLC, St. James, NY (US)

(72) Inventors: Vincent Basilice, St. James, NY (US); Dahna Basilice, St. James, NY (US); James Greco, Whitestone, NY (US)

(73) Assignee: I IDEAS LLC, St. James, NY (US)

( * ) Notice: Subject to any disclaimer, the term of this patent is extended or adjusted under 35 U.S.C. 154(b) by 0 days.

(21) Appl. No.: 18/649,633

(22) Filed: Apr. 29, 2024

(65) Prior Publication Data

US 2024/0364685 A1 Oct. 31, 2024

Related U.S. Application Data

(60) Provisional application No. 63/528,101, filed on Jul. 21, 2023, provisional application No. 63/462,580, filed on Apr. 28, 2023.

(51) Int. Cl.
*H04L 9/40* (2022.01)

(52) U.S. Cl.
CPC .................. *H04L 63/0861* (2013.01)

(58) Field of Classification Search
CPC .................................................. H04L 63/0861
See application file for complete search history.

(56) References Cited

U.S. PATENT DOCUMENTS

| 8,707,387 B2 * | 4/2014 | Gasparini | H04L 9/3213 726/1 |
| 8,886,718 B2 * | 11/2014 | D'Angelo | H04L 67/146 713/168 |
| 10,764,300 B2 * | 9/2020 | Maheshwari | G06F 21/45 |

(Continued)

FOREIGN PATENT DOCUMENTS

| WO | WO-0172023 A1 * | 9/2001 | H04L 29/1216 |
| WO | WO-2005088952 A1 * | 9/2005 | G07C 9/00031 |

(Continued)

OTHER PUBLICATIONS

Li. English translation of WO-2017215080-A1. (Year: 2017).*

(Continued)

*Primary Examiner* — Sarah Su
(74) *Attorney, Agent, or Firm* — Rowan Tree Law Group, PLLC; Joseph W. Schmidt

(57) ABSTRACT

A system for enabling a user access to one or more products/services of a host offering services through a network or the internet. The system generates a unique user identifier which is unique to the user in response to, or as a result of, creating an account with an authenticator application product of the system. The unique user identifier is used by a host to confirm registration of the user with the services offered by the host. The system requires user authentication involving one or more biometric authentication processes to create an account and thereafter access the account to select one or more host services. Upon selecting a given host service, the host verifies the account and transmits visual indicia to an electronic device on which the services will be displayed and accessed. The system enters the visual indicia through one or more scanning or imaging modalities to access the selected services.

24 Claims, 31 Drawing Sheets

(56) References Cited

U.S. PATENT DOCUMENTS

| | | |
|---|---|---|
| 2010/0115607 A1 | 5/2010 | Pratt |
| 2013/0219479 A1 | 8/2013 | DeSoto |
| 2014/0337634 A1 | 11/2014 | Starner |
| 2016/0308840 A1* | 10/2016 | Munshi ................. H04L 51/066 |
| 2017/0061441 A1* | 3/2017 | Kamal ................. G06Q 20/326 |
| 2018/0082050 A1 | 3/2018 | Flink |
| 2019/0208076 A1* | 7/2019 | Berman ................ H04L 9/3231 |
| 2019/0281036 A1* | 9/2019 | Eisen ...................... G06F 21/31 |
| 2020/0304491 A1 | 9/2020 | Dorfman |
| 2021/0406904 A1* | 12/2021 | Ravinathan ........... H04L 9/3213 |
| 2024/0106823 A1* | 3/2024 | Ricchuiti ............ H04L 63/0861 |

FOREIGN PATENT DOCUMENTS

| | | | | |
|---|---|---|---|---|
| WO | WO-2017140200 A1 * | 8/2017 | ............. | G06F 21/42 |
| WO | WO-2017215080 A1 * | 12/2017 | | |
| WO | WO-2022046500 A1 * | 3/2022 | ............. | G06F 21/44 |

OTHER PUBLICATIONS

International Search Report for PCT/US24/26870 dated Aug. 8, 2024, two (2) pages.

Written Opinion of the International Search Authority PCT/US24/26870 dated Aug. 8, 2024, nine (9) pages.

* cited by examiner

UNIVERSAL AUTHENTICATOR APPARATUS FOR OBTAINING HOST SERVICES

CROSS-REFERENCE TO RELATED APPLICATION(S)

This application claims benefit of and priority under 35 U.S.C. § 119 (c) to and is a non-provisional of U.S. Provisional Patent Application No. 63/528,101 filed on Jul. 21, 2023 and U.S. Provisional Patent Application No. 63/462,580 filed Apr. 28, 2023, both of which are hereby incorporated by reference herein in their entireties.

BACKGROUND

The present disclosure relates to an authenticator methodology, system and apparatus, and, in particular, relates to an authenticator apparatus for authenticating the identity of a user to enable access to one or more services provided by one or more hosts. The present disclosure further relates to authenticator apparatus including an authenticator application utilizing biometric recognition capabilities to access the application along with scanning technology which verifies subscription status with respect to one or more host services. The authenticator apparatus enables access to the host services including multiple HOST devices without requiring entry of one or more passwords.

Service providers which provide various services over the Internet generally require entry of confirmation data particularly a password to access the service for which a user has a subscription, utilizes or has an account. The passwords are generally entered as part of the "sign in" or "log in" data requiring entry through a portal or software product accessing the services. Most users have multiple passwords for the each of the accessible services for security reasons. However, recalling the multiple passwords is generally difficult for the user, and may result in the user generating a new password each time the user attempts to access an account.

The use of passwords for access to various host services presents additional concerns. Moreover, it is commonly accepted that the use of passwords is the weakest link in the cybersecurity chain and in the protection of sensitive accounts. Several password "cracking" techniques used by cybercriminals are sophisticated and algorithm driven. Once the password is cracked the cybercriminal can access the account, and in the event the user uses multiple accounts may access these accounts as well. Suffice it to say, online or web accounts which are password dependent are deficient in adequately preventing unauthorized access to a user's account.

Accordingly, there is a need for a centralized system, apparatus and methodology which enables a user to access multiple web based services without requiring entry of a password for each account during sign-in. There is also a need for a system which provides one or more authentication processes, for example, biometric authentication processes, that unequivocally confirms the identity of the user prior to access to the web-based account thereby disabling access by an imposter or sharing of a password with other third party members. There is also a need for a centralized system which requires multiple verification processes for web-based accounts which are highly sensitive such as without limitation financial web based services, health services, etc.

SUMMARY

Accordingly, illustrative embodiments of the present disclosure are directed to a system enabling access to multiple web-based services through a centralized location or software product. In illustrative embodiments, the system is directed to an apparatus and method which requires one or more authenticator processes utilizing, in embodiments, biometric verification of the user to enable access to services available to the user via the internet. In illustrative embodiments, only the user associated with the software product can access or open the software product through one or more biometric verification processes unique to the particular user. This prevents unauthorized access to the user's accounts, eliminates unauthorized hacking of passwords as a means for cybercriminals to access an account of a user and also prevents sharing of passwords between users and family members or friends thereby protecting the third party service provider from unauthorized use of their services. Moreover, illustrative embodiments of the present disclosure are directed to an authenticator software product which may be accessed through a website or downloaded onto an electronic device as an "APP" that provides centralized access to multiple HOST services available on the internet. The authenticator software product includes multiple biometric verification to positively confirm the user attempting to access a service of a HOST provider is the registered owner or user of the account. In some embodiments, multiple verification processes are employed in for example sensitive accounts or financial accounts.

In one illustrative embodiment, a system for enabling access of a user to multiple host services comprises a user device including a data store configured to store one or more biometric features of a user and configured to generate a unique user identifier for enabling access to an application product accessible via the user device, an interface associated with the user device, the interface configured to verify the user based on the stored one or more biometric features to enable access to the application product, a communication link associated with the user device configured to enable communication of the application product with one or more host services available on a computer network and to transmit the unique user identifier to a selected one host service of the one or more host services and one of an image or scanning engine associated with the interface of the user device, the one of an image or scanning engine configured to enter sign in indicia or code transmitted by the selected one host service to the user device or to an electronic device, to thereby enable access to services of the given host service.

In another illustrative embodiment, a method comprises opening an authenticator application product with a user device, creating a user account with the authenticator application product, initiating one or more authentication processes associated with the authentication application product for a user of the user device, executing the one or more authentication processes on the user with the user device and registering the user account with one or more service providers. The steps are implemented by one or more processors coupled to memory.

In embodiments, the one or more authentication processes include at least one of passcode recognition, facial recognition, voice recognition, fingerprint recognition, iris recognition, retinal recognition or DNA recognition.

In some embodiments, initiating one or more authentication processes includes initiating multiple ones of the one or more authentication processes.

In certain embodiments, the method includes generating a unique user identifier for the user account.

In embodiments, the method includes registering the unique user identifier with the one or more service providers.

In some embodiments, the method includes accessing the one or more service providers through the authenticator application product.

In certain embodiments, accessing the one or more service providers includes executing one or more verification processes of the authenticator application product with the user device, the one or more verification processes corresponding to the one or more authentication processes.

In embodiments, executing the one or more verification processes includes using the user device to verify the user through at least one of a passcode verification, facial verification, voice verification, fingerprint verification, iris verification, retinal verification or DNA verification.

In some embodiments, the method includes selecting on the authenticator application product a given host service from the one or more host services registered with the user account.

In certain embodiments, the method includes receiving, from the given host service, sign in indicia or code, the sign in indicia or code being displayed on a smart device capable of executing the given host service.

In embodiments, the method also includes entering, via the authenticator application product, the sign in indicia or code, with the user device.

In some embodiments, the sign in indicia or code includes visual indicia and wherein entering the sign in code or indicia includes scanning the visual indicia with an imaging module of the user device.

In certain embodiments, the visual indicia includes a quick response (QR) code.

In embodiments, the method includes receiving the given host service on the smart device.

In another illustrative embodiment, a method comprises accessing an authenticator application product with a user device, verifying through one or more verification processes a user associated with the authenticator application product, selecting a given host service from one or more host services registered with the authenticator application product, receiving, from the given host service, sign in indicia or code, the sign in indicia or code being displayed on an electronic device capable of executing the given host service, entering, via the authenticator application product, the sign in indicia or code, with the user device and accessing the given host service on the electronic device. The steps are implemented by one or more processors coupled to memory.

In embodiments, the one or more authentication processes include at least one of passcode recognition, facial recognition, voice recognition, fingerprint recognition, iris recognition, retinal recognition or DNA recognition.

In some embodiments, the sign in indicia or code includes visual indicia and wherein entering the sign in code or indicia includes scanning the visual indicia with an imaging module of the user device.

In certain embodiments, the method includes directing a unique user identifier for the user account to the given host service to enable verification by the given HOST service of the user account.

In another illustrative embodiment, a computer program product, tangibly stored in a non-transitory computer-readable medium and comprising computer-executable instructions, wherein when executed, the computer-executable instructions cause a device to: open an authenticator application product with a user device; create a user account with the authenticator application product; initiate one or more authentication processes associated with the authentication application product for a user of the user device; execute the one or more authentication processes on the user with the user device; and register the user account with one or more service providers.

In embodiments, the one or more authentication processes include at least one of passcode recognition, facial recognition, voice recognition, fingerprint recognition, iris recognition, retinal recognition or DNA recognition.

DESCRIPTION OF THE DRAWINGS

Various aspects and features of the present disclosure are described hereinbelow with references to the drawings, wherein.

DETAILED DESCRIPTION

Figure 1:
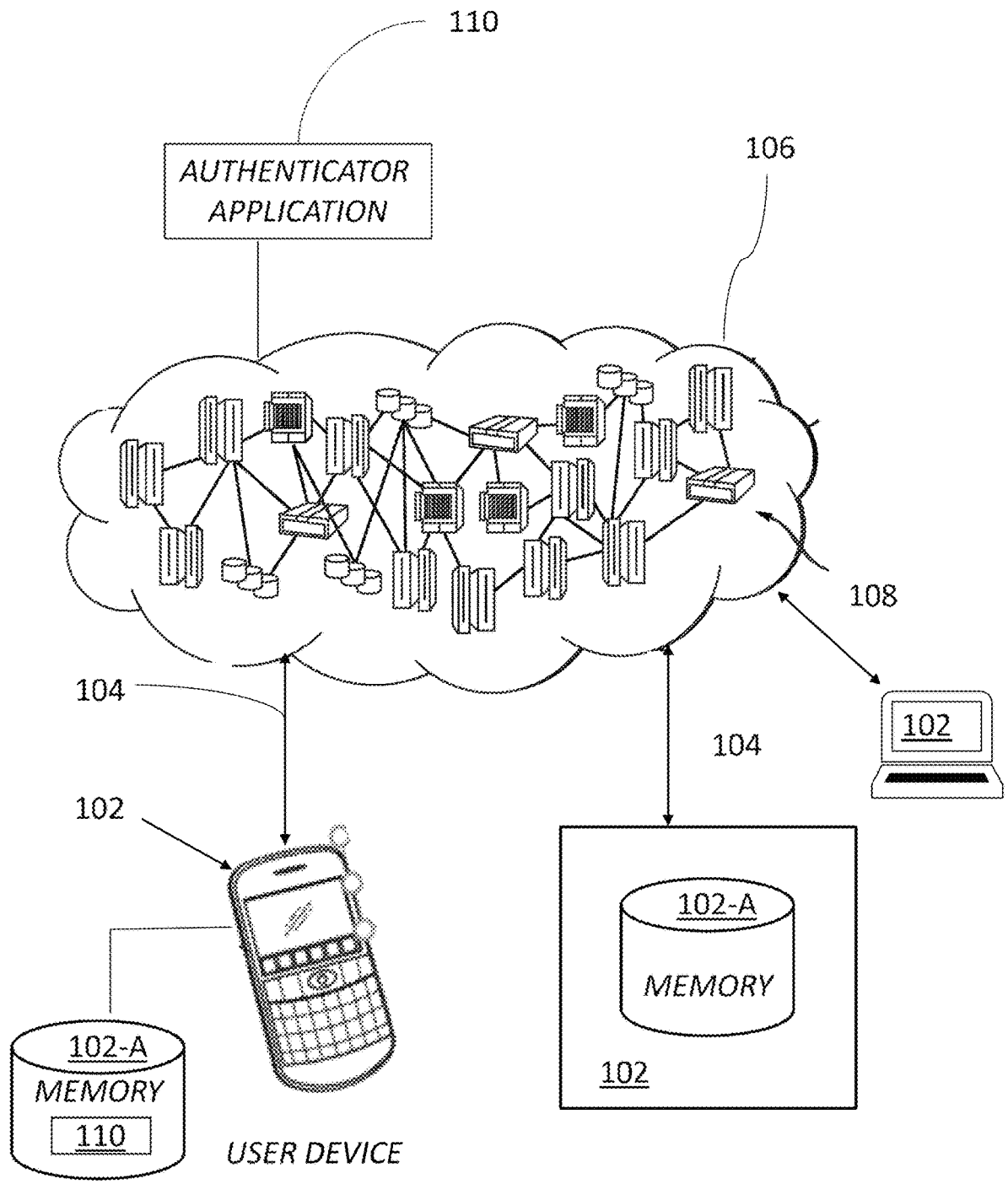
FIG. 1 is a system including the authenticator application product in accordance with one or more embodiments of the present disclosure.

In the discussion that follows, the term "USER" or "GUEST" is to be interpreted to mean without limitation any individual person, group or entity having access to the authenticator application product and system for purposes of acquiring services of a HOST Provider.

In the discussion that follows, the term "HOST" is to be interpreted to mean without limitation any individual person, group or entity providing HOST SERVICES over a computer network to the USER.

In the discussion that follows, the term "HOST SERVICES" is to be interpreted to mean without limitation any individual person, group or entity providing services over the internet or possibly off-line to a USER. HOST SERVICES Exemplative HOST SERVICES comprise, without limitation, entertainment services including media, television, podcast, streaming services, music services such as AMAZON PRIME, NETFLIX, HULU, APPLE, PANDORA, SPOTIFY, FACEBOOK etc., vendor services including department stores, AMAZON, E-BAY, financial services including banks or other financial institutions.

In the discussion that follows, the term "authenticator application" or "authenticator software" is to be interpreted to mean without limitation the application or software product which provides centralized verification and access to multiple HOST SERVICES.

In the discussion that follows, the term "electronic device" or "smart device" is to be interpreted to mean without limitation any electronic device on which a HOST SERVICE will be displayed and utilized by the USER. These devices may include without limitation a TV, a smart TV, a computer, a Tablet, a laptop, a desktop, a smart phone or any device identified in association with the USER DEVICE.

Embodiments of the present disclosure provide a method, system and computer program product for enabling a USER access to one or more products/services of a HOST through an application software product accessible through one or more links, software products, etc. via a USER DEVICE 102 such as a mobile electronic device, mobile phone, tablet, personal digital assistant, desktop computer, laptop computer etc. (hereinafter collectively referred to as a "USER DEVICE"). More specifically, illustrative embodiments of the present disclosure are directed to an apparatus and system including an application software product, for example, a downloadable mobile application product or web-accessible software product (also referred to as authenticator application or the "Legitimately U") which enables access of a USER to a plurality of HOST SERVICES via a single location and application. In embodiments, the authenticator application generates a unique USER ID which is unique to the user in response to, or as a result of, creating an account with the authenticator application product. The unique USER ID is assigned by the authenticator application and is not visible to the user. The unique USER ID is made accessible to the HOST SERVICE, and is used by the HOST SERVICE to confirm registration of the USER with the services offered by the HOST SERVICE provider. A link to the application product is presented on the USER DEVICE, for example, as an icon, tab or the like. The authenticator application product requires user authentication involving one or more authentication processes, generally multiple authentication processes, and in embodiments at least seven (7) authentication processes, to create an account with the authenticator application product. In illustrative embodiments, a unique USER ID is created by the authenticator application product. The unique USER ID is not visible to the USER, and thus cannot be shared or accessed by any party including the USER. The unique USER ID is used to verify registration with third party HOST SERVICE providers. In embodiments, the authenticator application product is linked to multiple HOST SERVICE providers. In some embodiments, the HOST SERVICE providers have a relationship with the owners/managers/entities associated with authenticator application product through negotiated arrangements, contractual relationships or the like. Subsequent to setting up or creating an account with the authenticator application product, in order to open/access the account of the authenticator application product, the USER is required to go through one or more verification processes (including biometric processes) corresponding to the one or more authentication process used to set up the account. Once verification is effected, the authenticator application product is opened. The USER may then select a given third party HOST SERVICE provider to obtain the services thereof. In some embodiments, the USER has a preexisting relationship or account with the given HOST SERVICE provider. Upon selection of the given HOST SERVICE, the unique USER ID is communicated to the given HOST SERVICE provider. The unique USER ID may be known by the HOST SERVICE provider, and serves as confirmation that the USER has a subscription to the services provided by the HOST SERVICE provider. Upon acceptance of the unique USER ID, the HOST SERVICE provider transmits visual indicia to an electronic device or the USER DEVICE on which the services will be displayed and accessed. The visual indicia may be a QR code or the like. In embodiments, the authenticator application product will automatically open the imaging means of camera of the USER DEVICE to enable scanning of the QR code. The QR code is scanned and the HOST SERVICE provider opens the services for access by the USER.

In some embodiments, the account is opened and accessed via the authenticator application product by the use of one or more biometric verification capabilities including, for example, and without limitation, facial scanning, retinal scanning, iris scanning, fingerprint scanning, voice recognition, passcode verification and/or DNA verification, etc. The application product is a component of a system or apparatus which includes, or is coupled to, at least one computing node having a processor and memory, and is in communication with one or more HOSTs having one or more services or products. The application product, through the at least one compute node, serves as the authenticator to verify the USER may access the services/products of the HOST. In illustrative embodiments, the application product 1) enables opening for the USER a computer program or product (e.g., NETFLIX) of a HOST on a computer device such as a TV, smart TV or the like. 2) enables transmitting of an authentication link or visual indicia, for example, a QR code to a computer device, for example, a smart TV, owned, controlled and/or operated by the USER. The USER scans or takes a photo of the visual indicia, for example, the QR code, which is then transmitted to the at least one compute node and the HOST to provide a second layer of verification that the USER has a viable subscription to access the services/products of the HOST. The HOST in turn makes available the services to the USER on, for example, the smart TV, laptop computer or desktop computer.

Referring initially to FIG. 1, a block diagram of a system 100 including the authenticator application product according to illustrative embodiments of the present disclosure is shown. In some embodiments, the system 100 may comprise a plurality of USER DEVICES 102, only three being shown for clarity, a network 104 and a centralized computing environment 106 such as a cloud computing environment having one or more computing nodes 108.

The USER DEVICE 102, in some embodiments, may comprise any types or configurations of computing, mobile electronic, network, user, and/or communication devices that are or become known or practicable. The USER DEVICE 102 may, for example, comprise one or more tablet computers, such as an iPad® manufactured by Apple®, Inc. of Cupertino, Calif., programming workstations, such as the Titan® C200™ compact AMD® RYZEN® 9 Workstation PC (manufactured by Titan® Computers of Hallandale Beach, Fla.), and/or cellular and/or wireless telephones or "smart" phones, such as an iPhone® (also manufactured by Apple®, Inc.) or an Optimus™ L90™ smart phone manufactured by LG® Electronics, Inc. of San Diego, Calif., and running the Android® operating system from Google®, Inc. of Mountain View, Calif., or a Galaxy® Note20™ 5G (manufactured by Samsung® Electronics Co., Ltd. of Suwon, South Korea). In some embodiments, the USER DEVICE 102 may comprise devices owned and/or operated by one or more users, such as microservice and/or API software engineers, programmers, developers, and/or testers. In some embodiments, a first USER DEVICE 102 may comprise a mobile electronic device such as a smartphone, laptop, desktop or virtual machine (VM) or tablet housing a local or memory device 102-A and a second USER DEVICE 102 may comprise a desktop housing a memory device 102-A. In some embodiments, the USER DEVICE 102 may comprise one or more devices owned and/or operated by one or more users, such as a remote worker, employee, etc. According to some embodiments, the USER DEVICE 102 may store and/or execute specially programmed instructions (such as a mobile device application) to operate in accordance with embodiments described herein. The USER DEVICE 102 may, for example, execute one or more mobile device programs that activate and/or control the USER DEVICE 102, identify one or more rules associated with the applications, evaluate the one or more rules, and/or provide output. According to some embodiments, the USER DEVICE 102 may communicate with the computing environment 106 via the network 104 to invoke and/or utilize the authenticator application 110 which is accessed and/or downloaded onto the, for example, mobile electronic device as the USER DEVICE 102 via the one or more computing nodes 108 of the computing environment 106.

The network 104 may, according to some embodiments, comprise a Local Area Network (LAN; wireless and/or wired), cellular telephone, Bluetooth® and/or Bluetooth® Low Energy (BLE), Near Field Communication (NFC), and/or Radio Frequency (RF) network with communication links between the USER DEVICE 102 and the computing environment 106. In some embodiments, the network 104 may comprise direct communications links between any or all of the components interconnected via one or more wires, cables, wireless links, and/or other network components, such network components (e.g., communication links) comprising portions of the network 104. In some embodiments, the network 104 may comprise one or many other links or network components other than those depicted in FIG. 1. The USER DEVICE 102 may, for example, be connected to the computing environment 106 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single link or line, the network 104 may comprise any number, type, and/or configuration of networks that is or becomes known or practicable. According to some embodiments, the network 104 may comprise a conglomeration of different sub-networks and/or network components interconnected, directly or indirectly, by the components of the system 100. The network 104 may comprise one or more cellular telephone networks with communication links between the USER DEVICE 102 and the computing environment 106.

In some embodiments, the computing environment 106 includes one or more cloud computing nodes 108 with which local computing devices used by cloud consumers, such as, for example, personal digital assistant (PDA) or a cellular telephone, a desktop computer, a laptop computer, and/or automobile computer system may communicate. The computing nodes 108 may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices are intended to be illustrative only and that computing nodes 108 and cloud computing environment 106 can communicate with any type of computerized device over any type of network and/or network addressable connection (e.g., using a web browser).

One or more of the computing devices of the computing environment may access or store the authenticator application 110 to execute the application in accordance with the methodology described hereinbelow in FIGS. 2-27. In some embodiments the features of the authenticator application 110 may be embodied as an "APP" that is downloadable onto a USER DEVICE 102 such as an ANDROID, IPHONE or IPAD. In other embodiments, the authenticator application 110 may be accessible via a web address. In other embodiments, the authenticator application 110 may be stored on any storage medium and accessible through a link or the like to the USER DEVICE 102.

Figure 2:
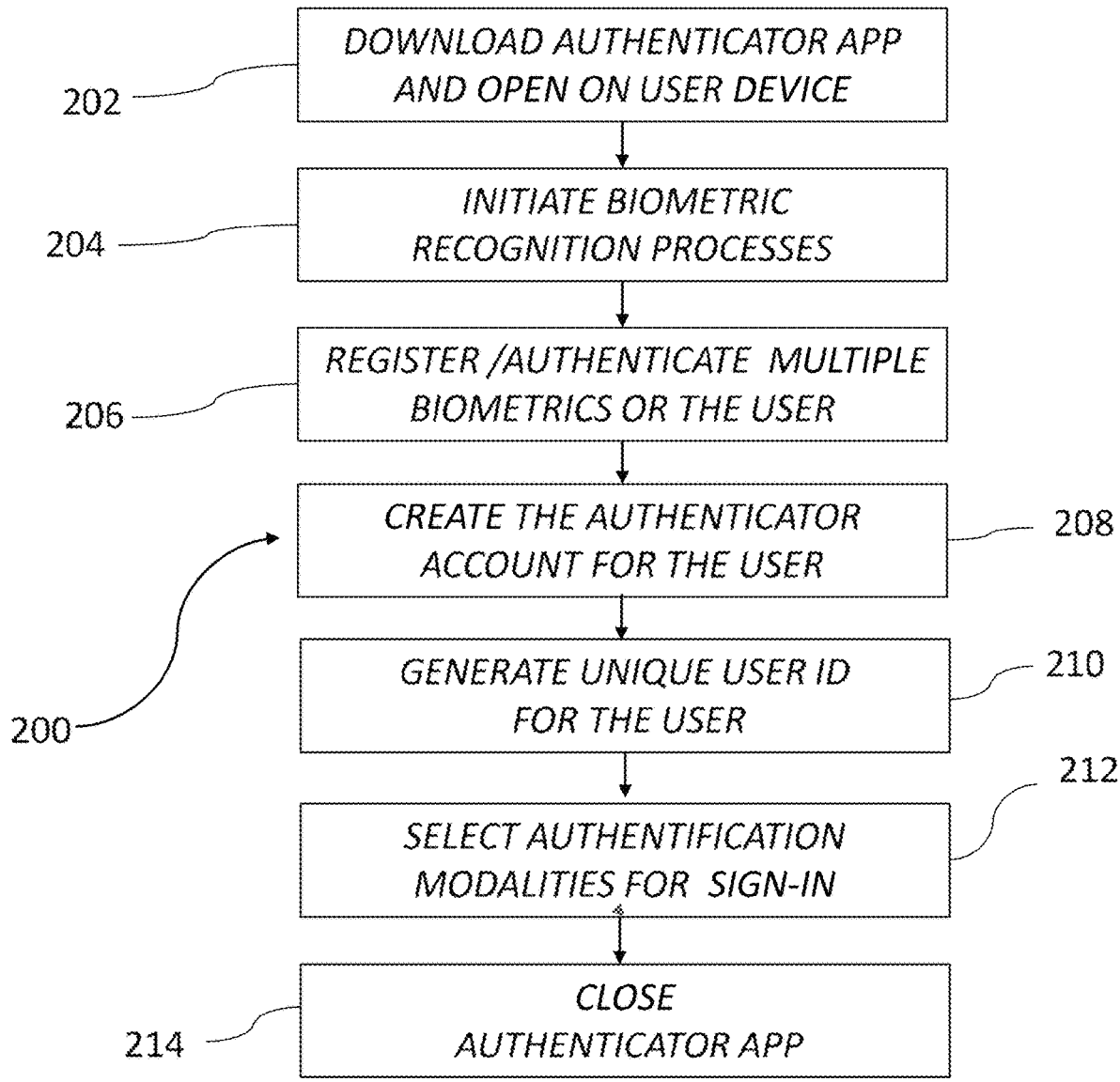
FIG. 2 is a flow chart illustrating a registration process associated with the authenticator application product of the system in accordance with one or more embodiments of the present disclosure.

Referring now to FIG. 2, there is illustrated a flow chart 200 depicting features of the system, methodology and product of the present disclosure. More specifically, the processes identified in the flow chart 200 are related to initial setup including acquisition/purchase of the application product by the USER, identification of various services requested or desired by the USER, and registration of biometric features of the USER with the at least one compute node and the one or more HOSTs. For example, in STEP 202, the authenticator application product is acquired and opened by the USER via the USER DEVICE 102. In illustrative embodiments, the authenticator application product may be available on the WEB through a web site or through conventional APP stores including, without limitation, Apple and Google apps. The authenticator application product is downloaded onto the USER DEVICE 102 or accessed through a web address by the USER DEVICE 102. As noted above in connection with FIG. 1, the USER DEVICE 102 may include a mobile phone, such as an IPHONE or ANDROID, that performs many of the functions of a computer, typically having a touchscreen interface or other input component, internet access, imaging/scanning capabilities and an operating system capable of running downloaded applications. In other embodiments, the USER DEVICE 102 is a laptop or desktop computer or any other smart device including a smart TV.

Once the authenticator application is downloaded, biometric recognition processes associated with the authenticator application are initiated for registration of the USER. (STEP 204) These biometric recognition capabilities may be independent of the biometric registration of biometric features of the USER DEVICE 102, required, for example, to open the USER DEVICE 102 or the phone. However, in illustrative embodiments, the biometric recognition processes utilize the software and processes stored, or accessible by, the USER DEVICE 102 including the imaging means, scanning, camera, speaker, microphone, touch pad etc. In certain embodiments, the authenticator application 110 presents various verification modalities for selection by the USER. The verification modalities may be presented on the screen or graphical user interface (GUI) of the USER DEVICE 102 in the form of a visual, an icon or text, and may include visual recognition such as facial, retinal or iris recognition, voice recognition, fingerprint, DNA verification or the like. In certain illustrative embodiments, the authenticator application 110 and/or the at least one compute node 108 includes recognition software to perform the visual, touch or voice recognition verification processes. Suitable recognition software algorithms include AMAZON™ REKOGNITION, BETAFACE, BioID, COGNITEC, DEEPVISION for facial recognition, RetinaLyze, AwareA-BIS for fingerprint, face, iris and retinal recognition and Aware, PHONEXIA for voice recognition. The recognition/authentication processes are initiated and stored in memory association with the authenticator application product 110. (STEP 206) In embodiments, the authenticator application 110 requires multi-verification processes including up to seven (7) authentication processes or more.

Thereafter, additional demographic information may be entered into the authenticator application product 110 via prompts provided on the screen of the USER DEVICE 102 and the authenticator account is created. (STEP 208) In STEP 210, the authenticator application 110 generates a UNIQUE USER ID upon creation of the authenticator account. In embodiments, the UNIQUE USER ID is automatically generated responsive to the authenticator account being created. The UNIQUE USER ID is specific to the USER and the authenticator application 110. The UNIQUE USER ID may be used for each available HOST SERVICE, i.e., the same UNIQUE USER ID is used for, and recognized by, each HOST SERVICE. In embodiments, the UNIQUE USER ID is automatically generated by the authenticator application 110, and may be encrypted with encryption software and algorithms. The UNIQUE USER ID may be transmitted and stored by each HOST SERVICE. In embodiments, the UNIQUE USER ID is not visible to the USER but is embodied in the stored data associated with the authenticator application 110 and optionally the HOST SERVICE provider. Thus, the USER may not transfer the UNIQUE USER ID to another user. In embodiments, the UNIQUE USER ID is recognized by the authentication application 110 and/or the HOST SERVICE provider to ensure that the USER is registered with the services provided by the HOST SERVICE provider.

In embodiments, the USER selects the desired authentication process or modality to use during subsequent "sign ins" or "log ins" to the authenticator application 110. (STEP 212). In some embodiments, multiple modalities may be selected depending on the sensitivity of the HOST SERVICES. The selection of multiple biometric capabilities may be significant in accessing HOST SERVICES relating to finance, health etc. to provide additional security to the USER and minimize potential for malicious access by an imposter or third party.

In STEP 214, the authenticator application is closed. In the alternative, the authenticator application may remain open for use as described in connection with FIG. 3.

Figure 3:
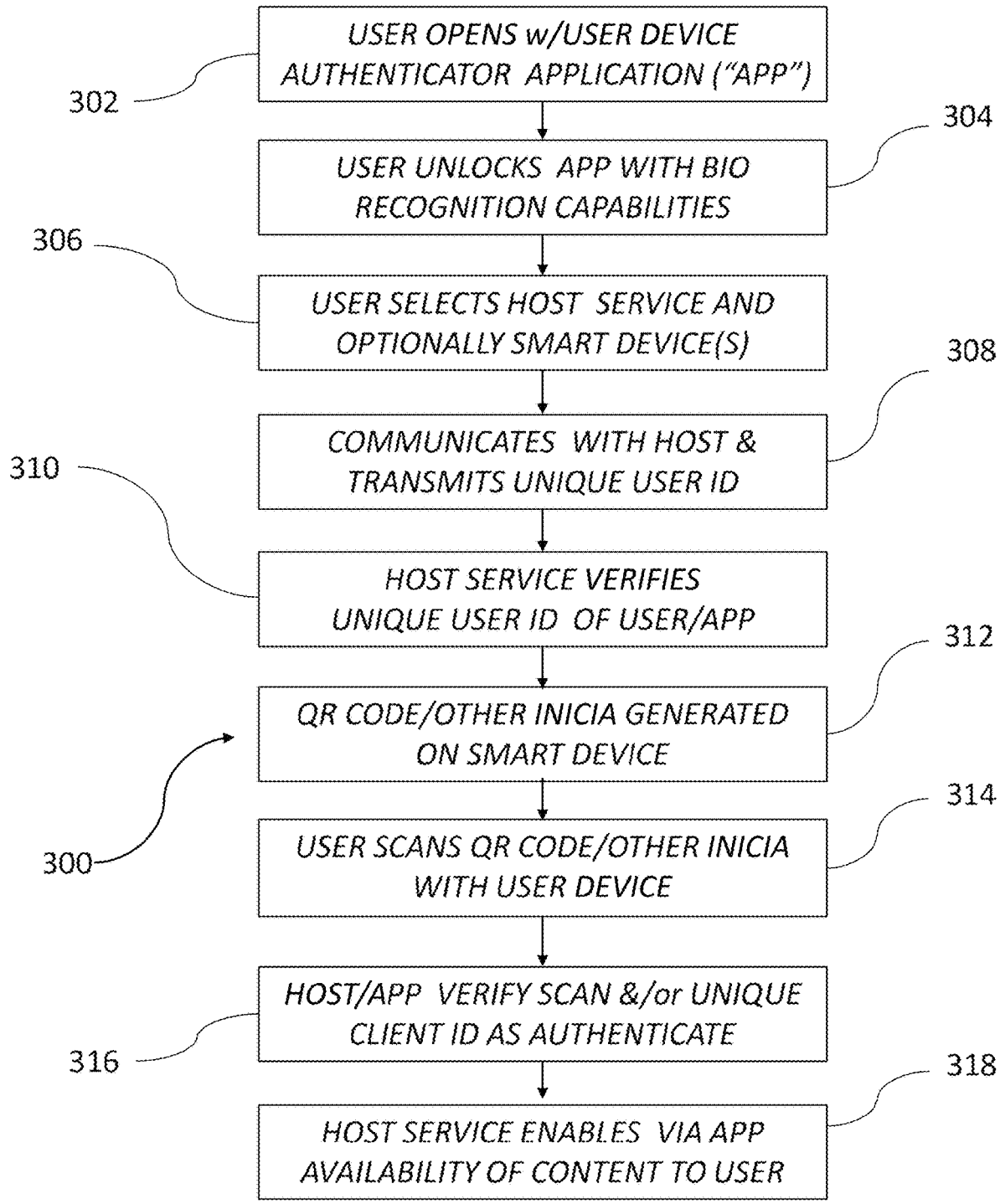
FIG. 3 is a flow chart illustrating a methodology of using the authenticator application in verifying access to host services in accordance with one or more embodiments of the present disclosure.

FIG. 3 illustrates a flow chart 300 depicting one illustrative methodology of use of the installed authenticator application product 110. In STEP 302, the USER opens the authenticator application 110 on the USER DEVICE 102. In embodiments, the authenticator application 110 is previously downloaded on the USER DEVICE 102 in the manner described in connection with FIG. 2. The authenticator application 110 may be presented as an icon or other visual logo on the screen of the USER DEVICE 102. The USER then unlocks the authenticator application 110 with the use of biometric recognition capabilities described hereinabove. (STEP 304) For example, the USER may utilize facial recognition, retinal recognition or iris recognition, fingerprint, voice, DNA recognition capabilities and/or a passcode associated with the authenticator application 110. In illustrative embodiments, a photo or scan may be taken by the USER DEVICE 102 with the imaging means, camera or scanner of the USER DEVICE 102 to generate visual digitized data which is sent to the authenticator application 110 and/or the computing nodes 108. In other illustrative embodiments, the touch pad of the USER DEVICE 102 may be engaged with the thumb of the USER to generate visual digitized data which is sent to the authenticator application 110 and/or the computing nodes 108. In other embodiments, a passcode may be entered to open the authenticator application 110. In other embodiments, the microphone and speaker of the USER DEVICE 102 may be used for voice recognition. Once the biometric data is recognized, the authenticator application 110 is unlocked and opened.

Thereafter, the USER selects a HOST SERVICE registered with the authenticator application 110. (STEP 306) The selected HOST SERVICE may be chosen from a plurality of HOST SERVICES registered with the authenticator application 110. For example, various HOST SERVICES may have a relationship with the authenticator application 110, for example, the entity owning or governing the use of the authenticator application 110. In illustrative embodiments, the HOST SERVICE is automatically populated on the screen of the USER DEVICE 102 subsequent to recognition and unlocking of the authenticator application 110. In other illustrative embodiments, the HOST SERVICE may be searched through a search menu generated by the authenticator application 110 on the screen of the USER DEVICE 102. In some embodiments, the HOST SERVICE may be stored with the authenticator application 110 as historical data and accessed through a historical register. Once the HOST SERVICE is selected, the computing node 108 and/or the authenticator application 110 (or via the authenticator application 110) communicates with the HOST SERVICE of the selection made by the USER through the USER DEVICE 102. (STEP 308) In illustrative embodiment, the computing node 108 and/or the authenticator application 110 transmits/conveys the UNIQUE USER ID of the USER associated with the HOST SERVICE to the HOST SERVICE provider. The HOST SERVICE then verifies the authenticity of the USER and subscription to the HOST SERVICE via the transmitted UNIQUE USER ID. (STEP 310). Once verification is obtained, a visual indicia, code including for example, a QR Code, is generated on the selected smart device (STEP 312) owned by the USER. In embodiments, the QR code is generated by the HOST SERVICE provider. In other embodiments, the authenticator application 110 may generate the QR code. In embodiments, a sign-in page or screen may be opened on the smart device or electronic device beforehand by the user. In some embodiments, the USER has a pre-existing account with the HOST SERVICE provider. In certain embodiments, the electronic or smart device may be registered with the authenticator application 110 and/or the HOST SERVICE provider. In illustrative embodiments, registration may be effected through providing the product ID, Serial No., IP address associated with the one or more smart TVs or devices. In illustrative embodiments, the HOST SERVICE may send one or more signals to the computing node 108 and/or the authenticator application 110 upon completion of STEP 310, whereby the computing node 108 and/or the authenticator application 110 transmits a signal to the smart device to generate the QR code on the screen of the smart device. In some embodiments, the HOST SERVICE can automatically open the website pr "log-in" page on the smart screen in response to receiving the unique USER ID, and optionally present the QR code on the screen of the smart device.

With the QR code on the smart device, the USER utilizes the imaging means, including the scanner and/or camera, on the USER DEVICE 102 to scan or take a photo or image of the QR code. (STEP 314). The scanned code is transmitted and verified as authenticate by the HOST SERVICE or the authenticator application 110. (STEP 316). The HOST SERVICE then authorizes transmission of the HOST SERVICES to the USER enabling access to the HOST SERVICES. (STEP 318) The USER may then use the HOST SERVICES on the smart device or smart TV.

The present disclosure provides a universal centralized system that's easy to use, delivers superior security and has the ability to be used on multiple platforms of HOST SERVICE providers. All accessible and protected using your phone's facial recognition, and an end-to-end encryption system. The authenticator application 110 and associated system enables an electronic device to communicate with a central system that authenticates a request for HOST SERVICES. The authenticator application 110 may generate a UNIQUE USER ID and is capable of scanning a uniquely generated image (for example, a QR code) which is identified and approved through the camera of the USER DEVICE.

In illustrative embodiments, the HOST SERVICES may be any available services provided by a HOST and accessible in the computing environment identified in FIG. 1. Exemplative HOST SERVICES comprise, without limitation, entertainment services including media, television, podcast, streaming services, music services such as AMAZON PRIME, NETFLIX, HULU, APPLE, PANDORA, SPOTIFY, FACEBOOK etc., vendor services including department stores, AMAZON, E-BAY, financial services including banks or other financial institutions.

In illustrative embodiments, the system may utilize additional security requirements for highly sensitive HOST SERVICES including financial services, medical services/providers etc., The additional verification mechanism may include without limitation, sending text codes to a USER's mobile device for entry into another window. (e.g., a two-step process). Moreover, the additional security requirement can be initiated in association with registration in connection with the methodology of FIG. 2 and/or access of the HOST services in connection with the methodology of FIG. 3. For example, multiple authentication processes may be required depending on the selected HOST SERVICE. For example, banking or financial type HOST SERVICES may require multiple verification modalities to open the authenticator application 110 and gain access to the HOST SERVICES.

Figure 4:
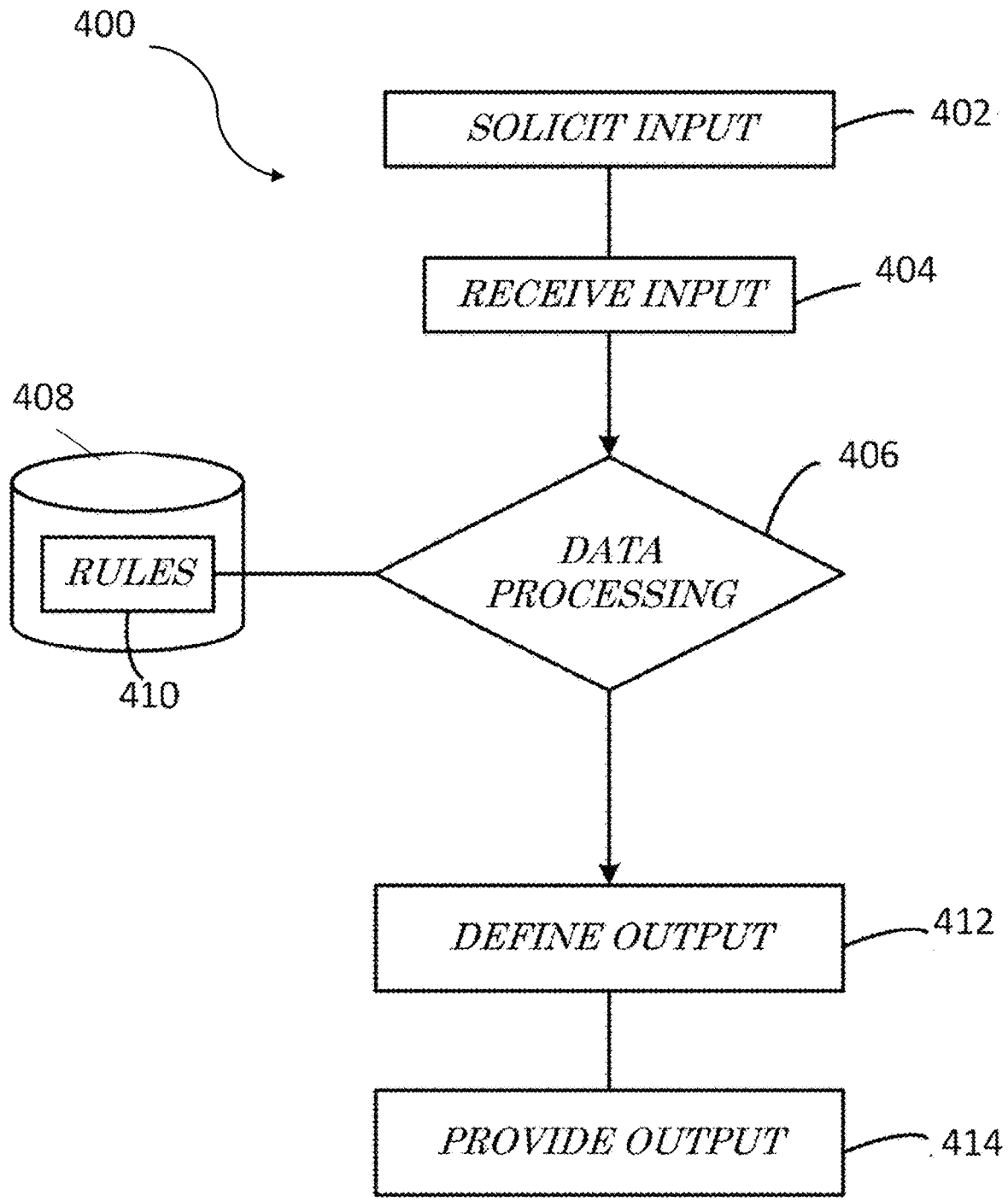
FIG. 4 is a diagram illustrating one or more algorithms embodied within the authenticator application in accordance with one or more embodiments of the present disclosure.

With reference to FIG. 4, for example, the computing device 108 includes storage or memory for storing or loading one or more algorithms embedded in the authenticator application 110. The algorithm 400 may comprise, for example, one or more software programs, modules, engines, and/or applications coded to perform any of the methods of FIGS. 2 and 3 herein, and/or portions thereof. The algorithm 400, and any reference to the term "algorithm" herein, refers to any set of defined instructions that operate upon input to define and/or provide output 414. The algorithm 400 may, for example, be specifically programmed and/or otherwise defined to instruct a computer or other device (not shown) to solve a particular problem (e.g., logical) and/or resolve a particular mathematical calculation (e.g., arithmetic). In some embodiments, the algorithm 400 may be written and/or defined as a series or sequence of instructions encoded in (e.g., written in accordance with syntax and/or semantics rules) a particular computer programming language (e.g., Python™, Java™, JavaScript™, C, C++, C#, Basic™, FORTRAN, COBOL, Ruby™, and/or Perl™), e.g., a set of instructions that convert and/or encode characters, objects, and/or other data elements into machine code (e.g., code operable to be executed by an electronic processing device, such as a CPU). In some embodiments, the algorithms include encryption algorithms.

According to some embodiments, the algorithm 400 may comprise soliciting input, at 402. Input from one or more sources may be searched for and/or queried, by structuring and/or executing a database query and/or by sending a data communication signal or "handshake", such as is common with Bluetooth® short-range communication protocols. In some embodiments, the algorithm 400 may comprise receiving the input, at 404. Whether solicited or otherwise provided and/or acquired (e.g., received as an incoming signal, loaded and/or downloaded), for example, the input for the algorithm 400 may be received, identified, and/or otherwise processed and/or located. According to some embodiments, the algorithm 400 may comprise data processing, at 406. The data processing 406 may, for example, comprise execution of one or more logical and/or computational procedures, modules, scripts, and/or routines that may be stored in a memory device 408 as a set of instructions or rules 410 and/or that may be defined and/or implemented by one or more electrical, mechanical, and/or physical components, such as logic gates, diodes, transistors, relays, and/or switches (e.g., operable to execute any of the method of FIGS. 2 and 3 herein, and/or portions thereof).

In some embodiments, execution of the algorithm 400 may comprise a loading of the rules 410 into the memory 408 and/or into an electronic processing system (not shown) and/or an activation of one or more logic gates and/or other electrical and/or mechanical components. The algorithm 400 may operate upon the input in accordance with the rules 410 to achieve a result by defining output, at 412. The algorithm 400 may, for example, generate, produce, define, identify, calculate, and/or otherwise compute output based on an application of the data processing 406 utilizing the rules 410 and any or all input receiving at 404. According to some embodiments, the algorithm 400 may comprise providing the output, at 412. One or more output devices (not shown) may be utilized to convey the output (e.g., a result, conclusion, decision, etc.) to one or more other devices and/or entities (not shown), such as one or more users, consumers, customers, potential customers, and/or devices utilized thereby. The output may be displayed via an electronic display screen of a computer, mobile/smart phone, smart watch, etc., and/or may be transmitted as one or more electronic signals to one or more network destination addresses, such as e-mail addresses, URL locations, MAC addresses, and/or broadcast radio frequencies.

According to some embodiments, the data processing at 406 may comprise execution of a listing, sequence, matrix, and/or other set of stored steps and/or instructions that utilize the input to define the output. In some embodiments, the listing of steps and/or instruction details may comprise elements that are known to those skilled in the art. The algorithm 400 may partially or completely comprise, for example, instructions and/or steps that are well known, such as steps and/or instructions operable to receive input and perform the steps of the authenticator application 110 described in connection with FIGS. 2 and 3. For any and all known procedures and/or instructions, the discrete details of such instructions are represented by the data processing at 406 and are not listed herein as one of ordinary skill in the art would readily comprehend both what such technological knowledge entails and that the inventor has possession of such knowledge. Instructions that may be included within and/or comprise the data processing at 406 (and/or the algorithm 400) may include, for example, but are not limited to, any known or practicable: (i) AI and/or ML data input classification algorithms, (ii) data transmission algorithms, (iii) data encoding algorithms, (iv) data decoding algorithms, (v) logical and/or mathematical data comparison algorithms, and (vi) data searching (e.g., keyword searching) algorithms.

Figure 5:
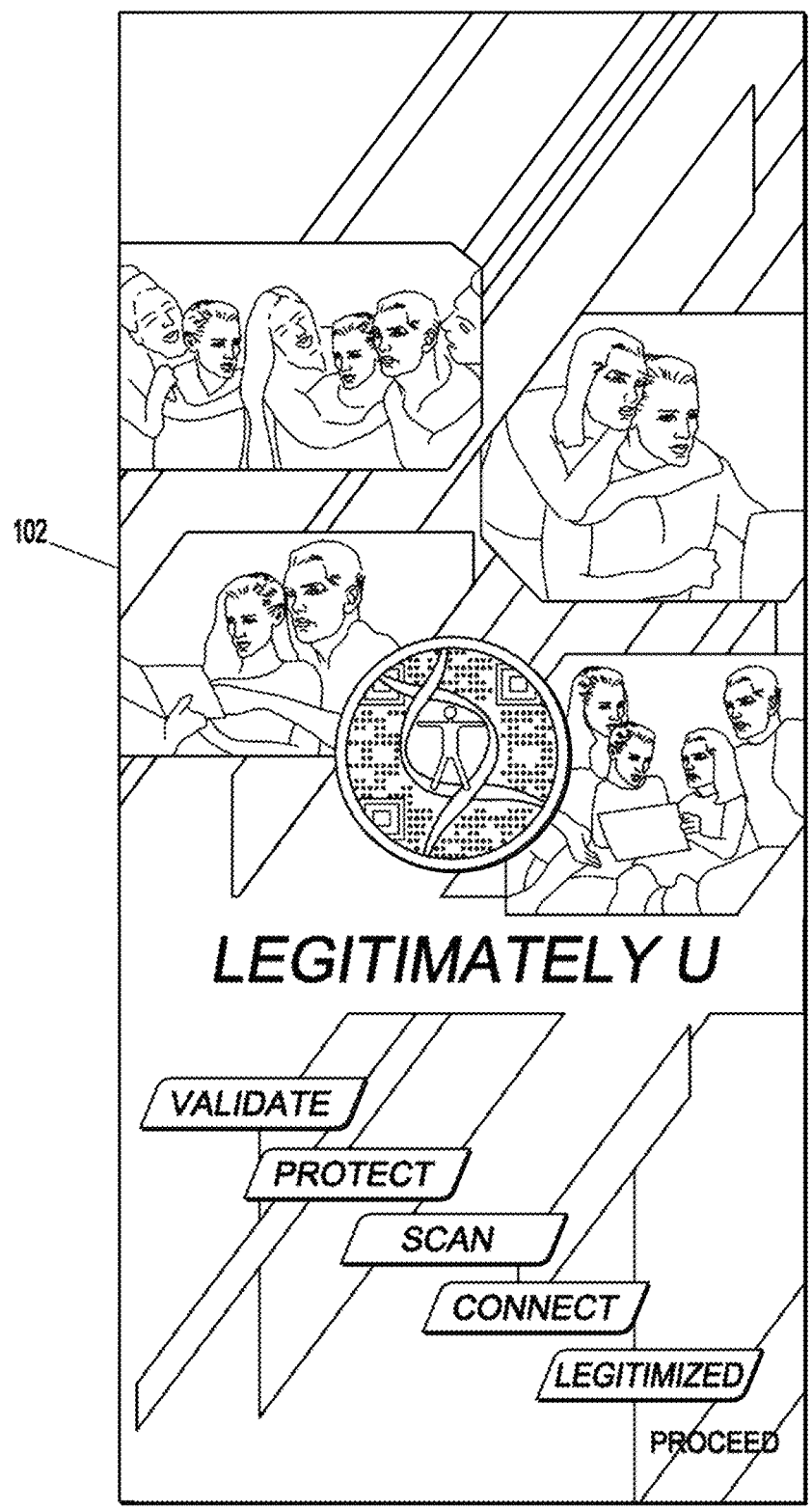
FIGS. 5-25 are views illustrating use of the authenticator application product in accordance with one or more illustrative embodiments of the present disclosure.
Figure 6:
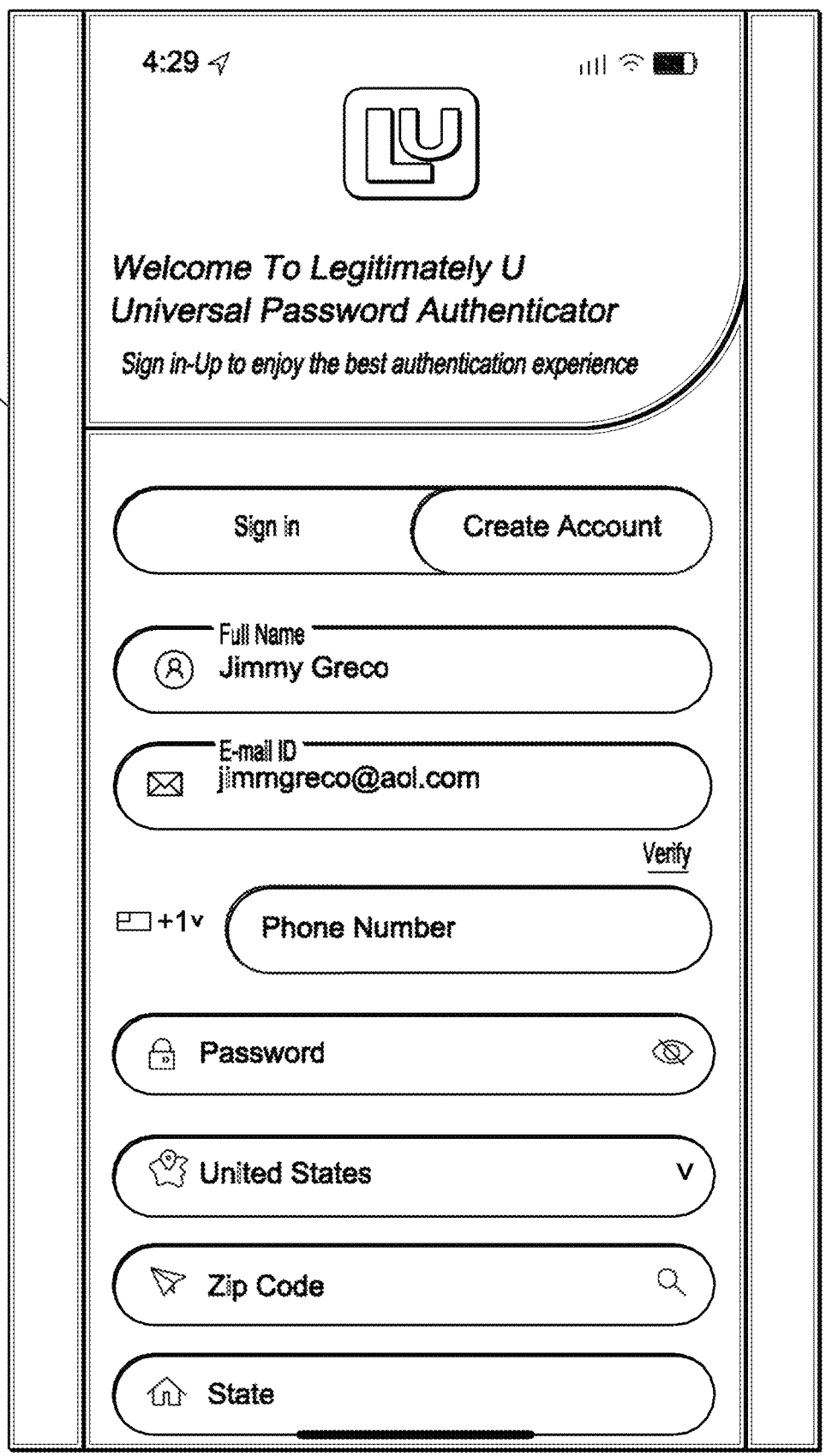
Figure 7:
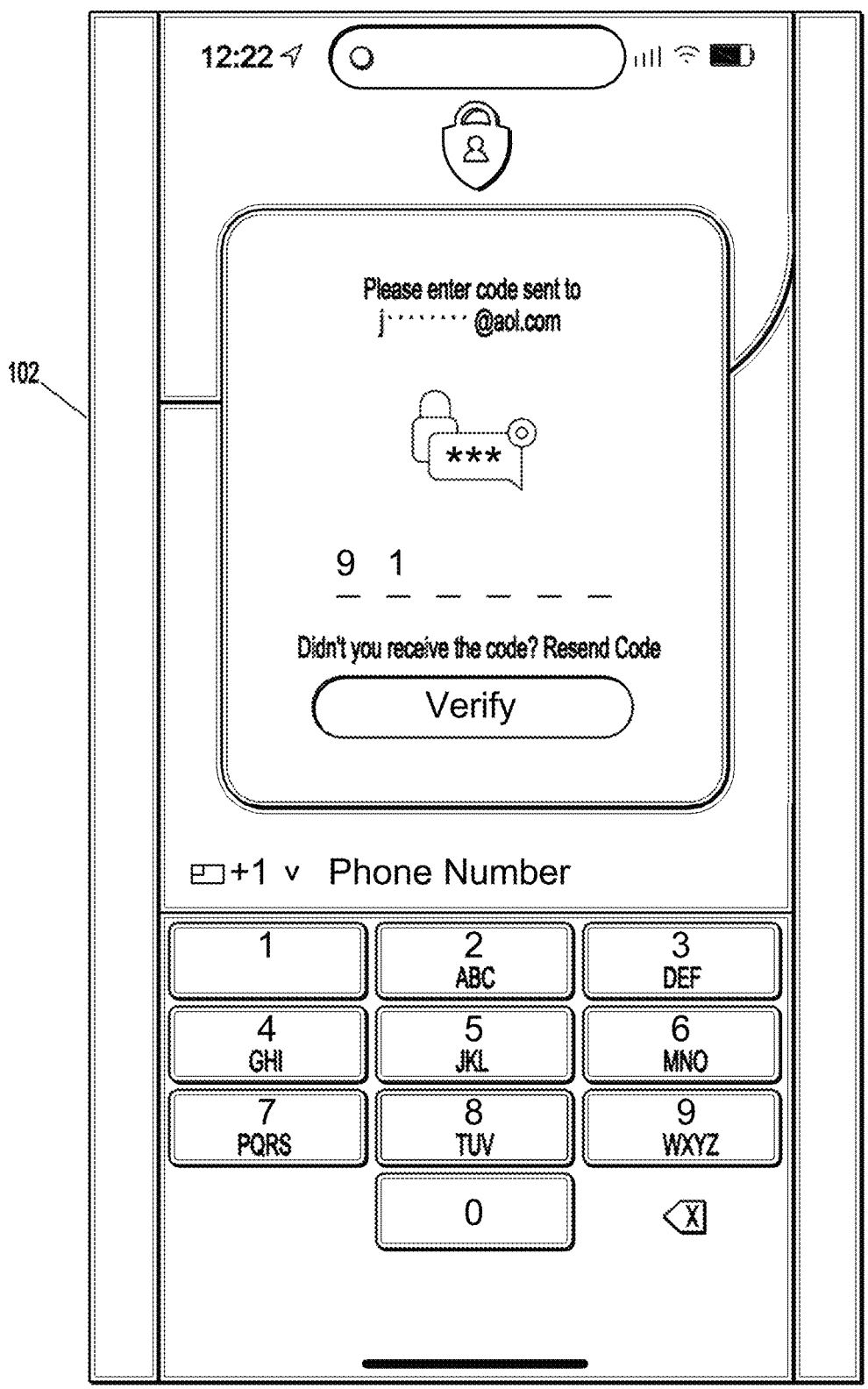

FIGS. 5-25 illustrate one exemplary embodiment of the authenticator application 110 of the present disclosure. Initially, the authenticator application 110 is accessed or downloaded onto the USER DEVICE 102. FIG. 5 illustrates the authenticator application 110 displayed on the screen or GUI of the USER DEVICE 102, and depicted in the form of, for example, a flash screen. The user is prompted to proceed and hits the "Proceed" icon (bottom right corner) on the screen. The next screen presented by the authentication application 110 is a request to "Sign-In" or "Create Account" as depicted in FIG. 6. In association with creating an account, the USER will contact the "Create Account" tab or icon, and enter demographic data including the user's full name and e-mail address is entered as shown in FIG. 6. In embodiments, upon entering the e-mail address, a verification process is initiated by the authentication application 110 to authenticate the e-mail address. In some embodiments, a code may be sent via the authentication apparatus 110 to the e-mail address. The code is retrieved from the user's e-mail and entered into the USER DEVICE 102 as shown in FIG. 7.

Figure 8:
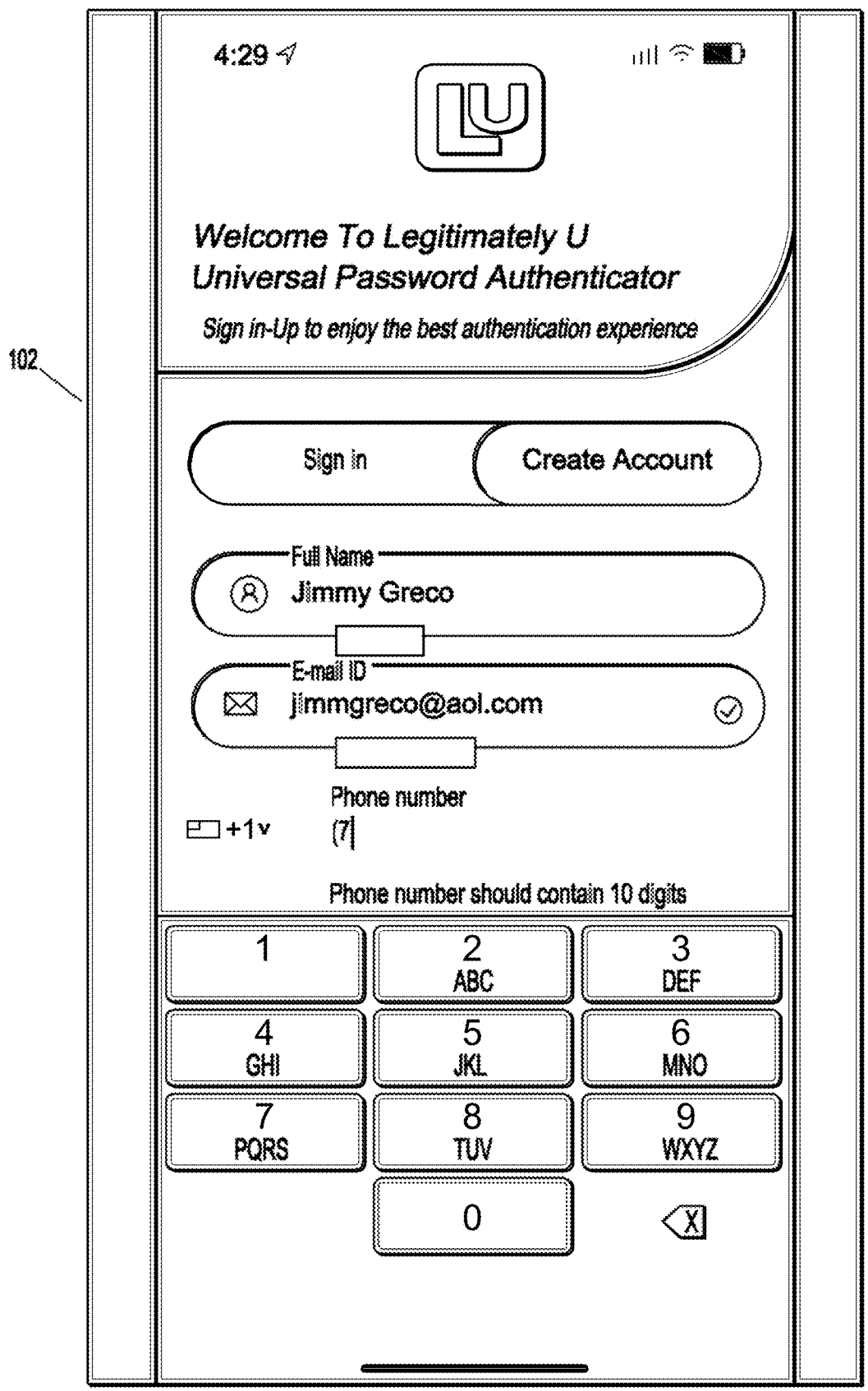
Figure 9:
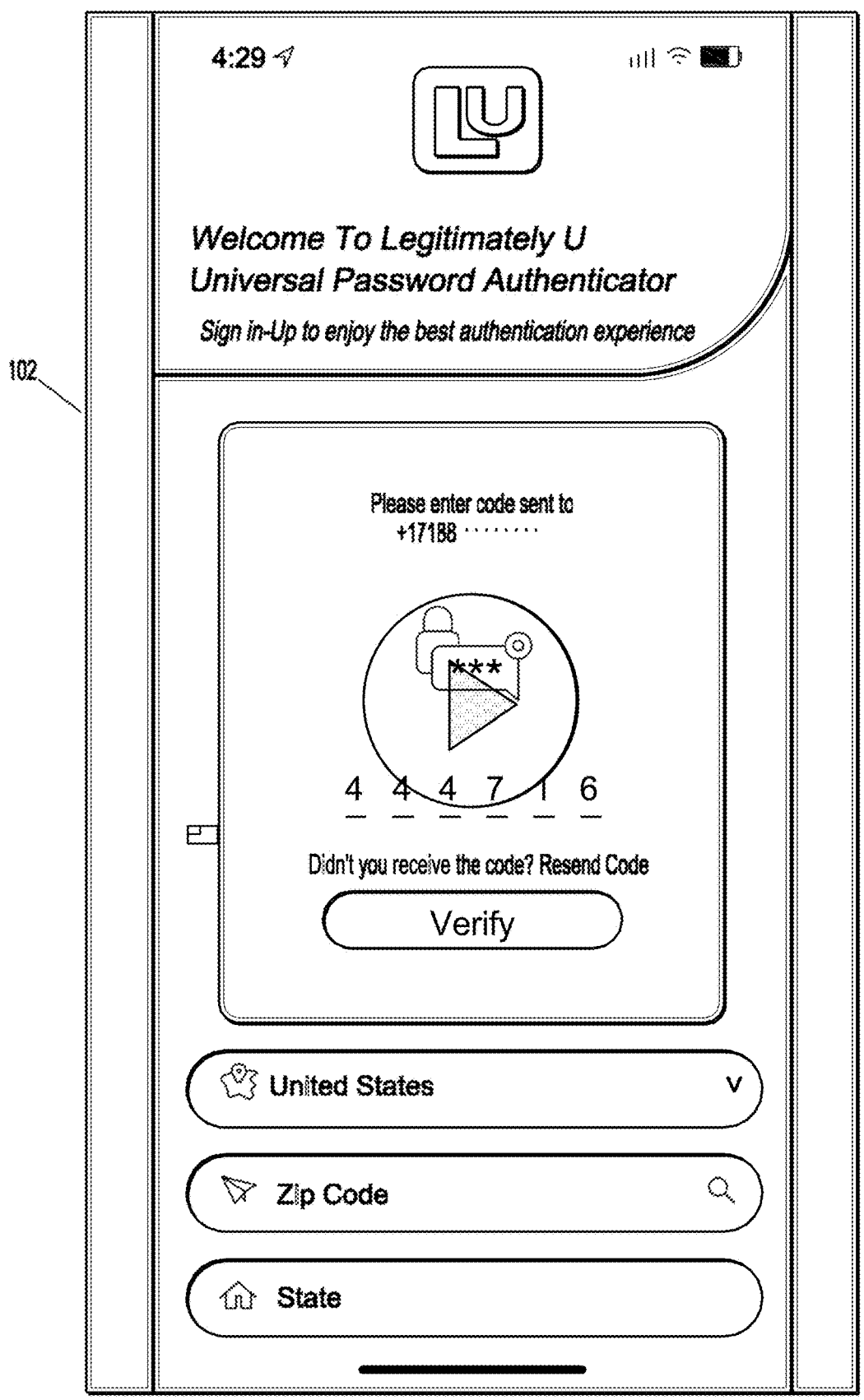
Figure 10:
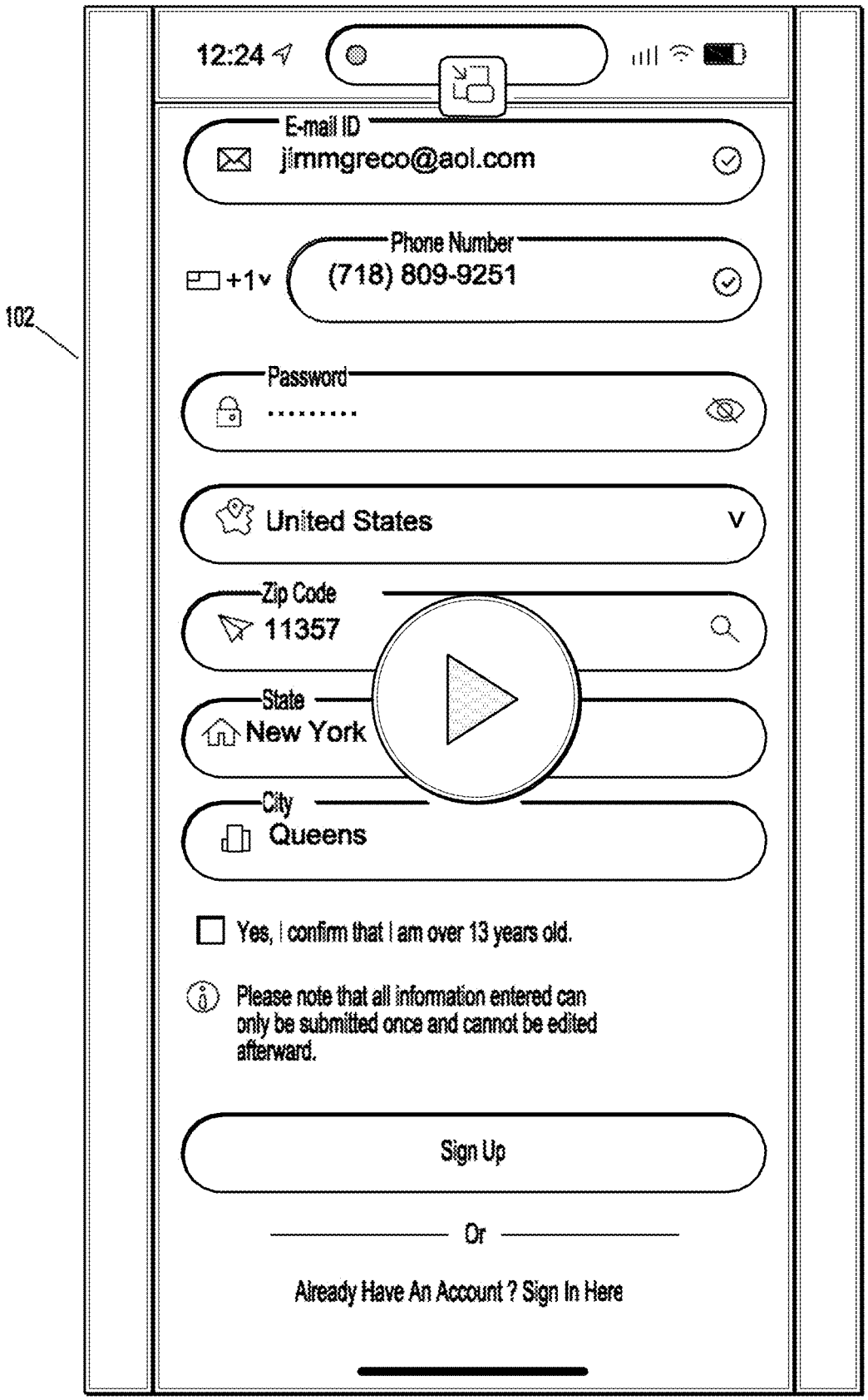

The registration or account creating process is continued by entering additional demographic data into the USER DEVICE 102 including, for example, a mobile device number. (FIG. 8). Upon entering the mobile device number, the authenticator application 110 automatically initiates and executes another authentication process involving sending a message, (for example, a text message) to the USER DEVICE 102 (e.g., a mobile device) containing another code. The code is retrieved from the message of the USER DEVICE 102 and entered into the USER DEVICE 102 via the input or keypad as depicted in FIG. 9.

The registration process is continued by entering a Password for the account as selected by the user, and also entering the country, zip code, city of the User. (FIG. 10) Once all the demographic data is entered, the user may select the "Sign-Up" button or icon presented on the USER DEVICE 102.

Figure 11:
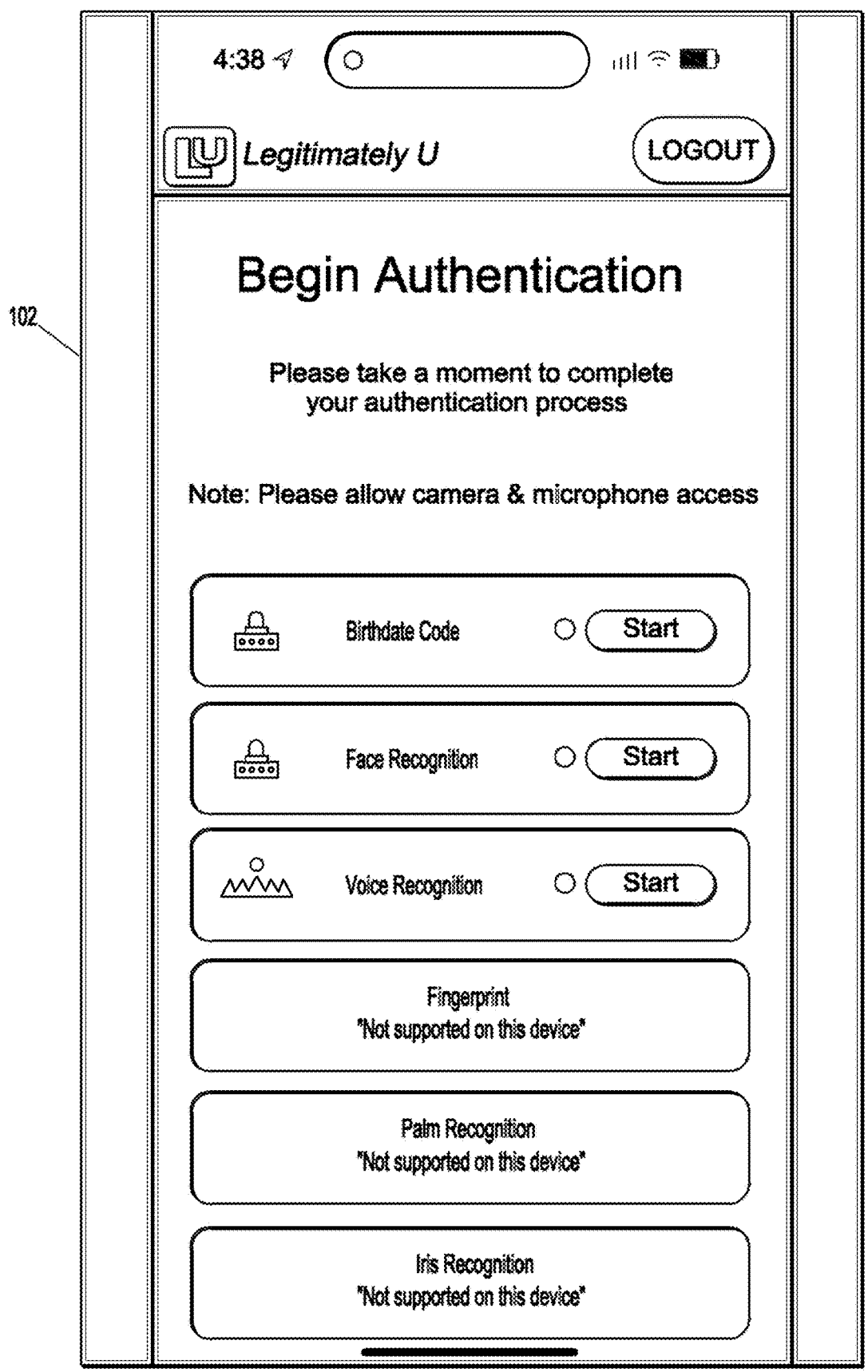
Figure 12:
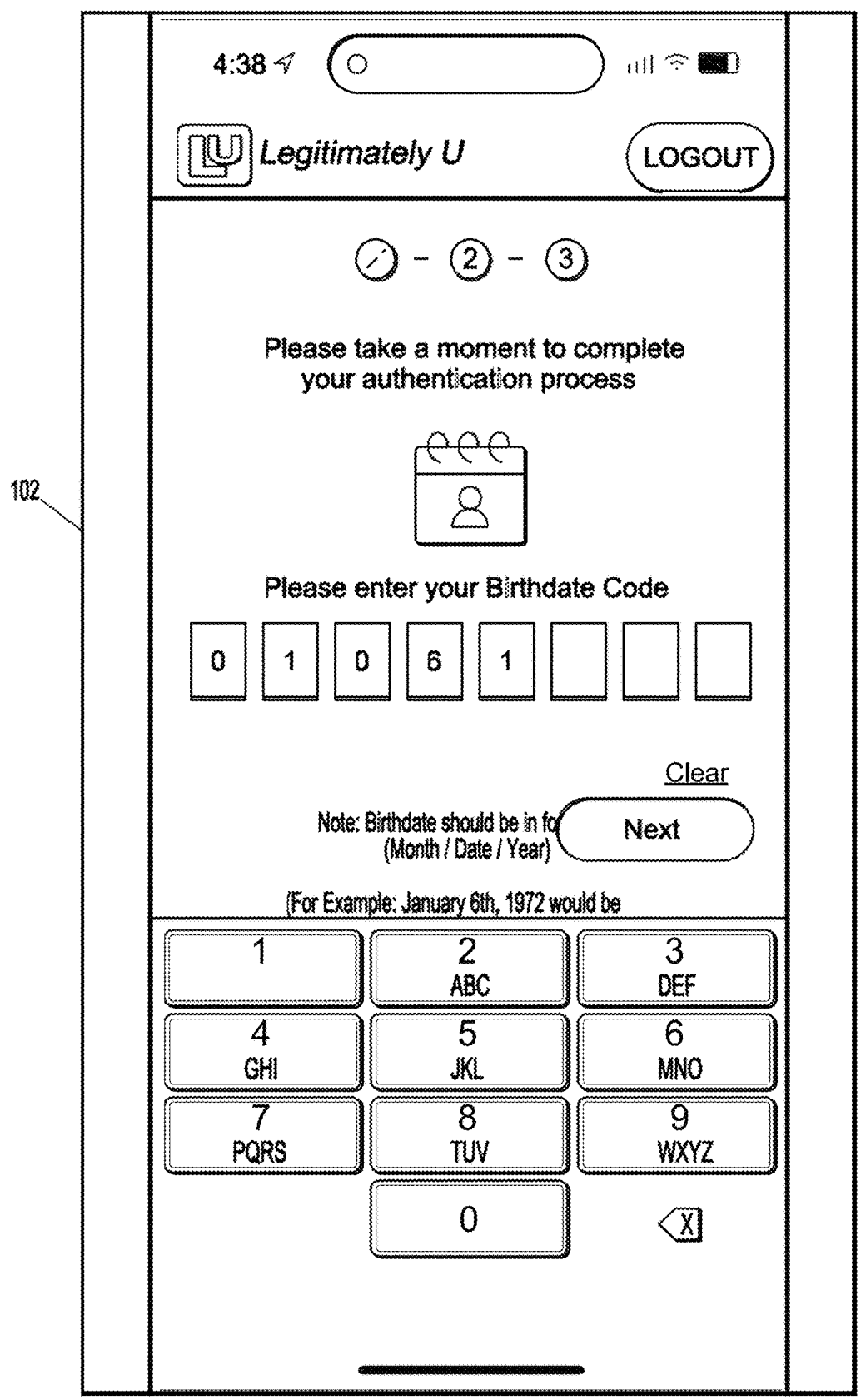
Figure 13:
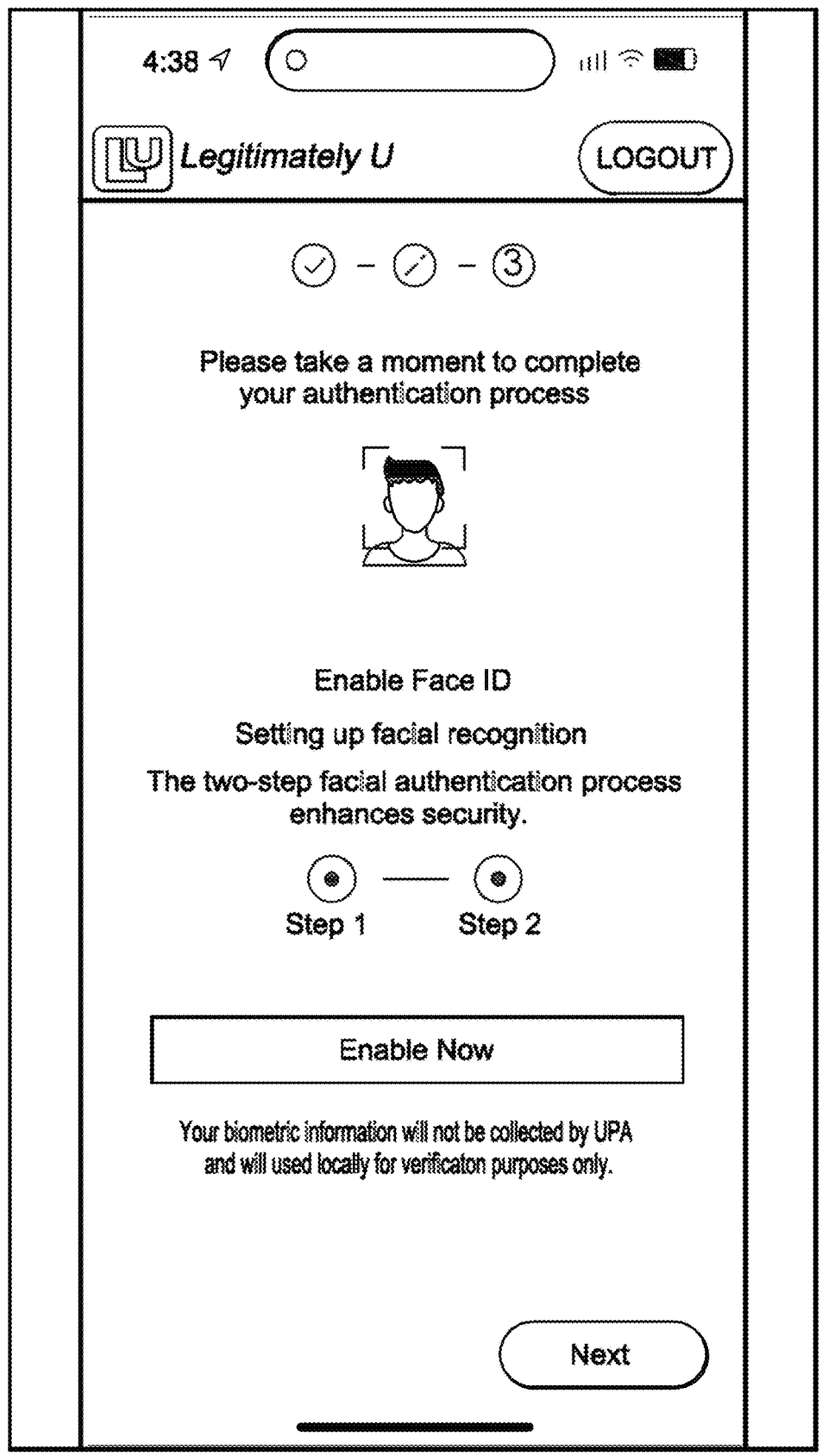
Figure 14:
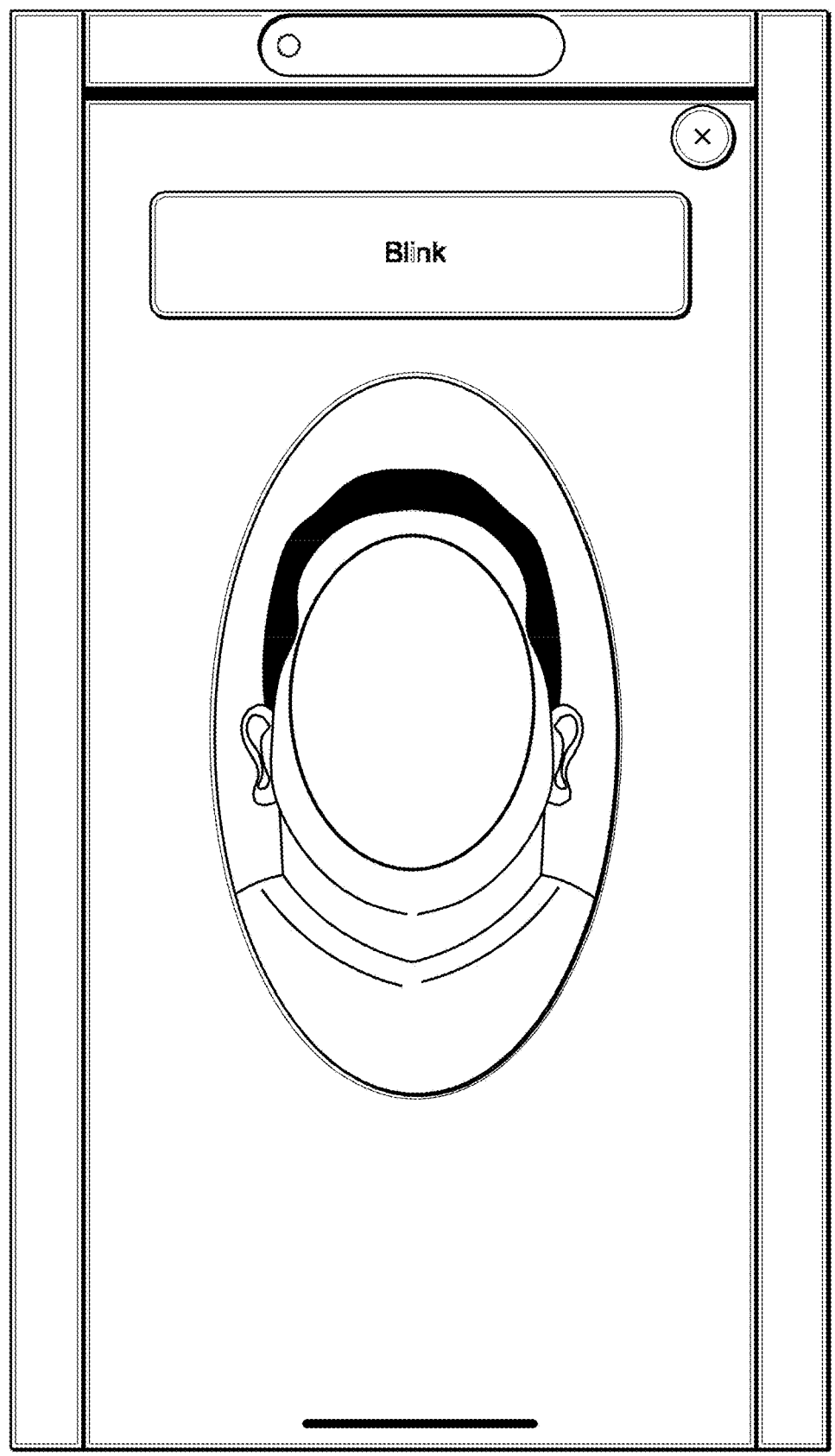
Figure 15:
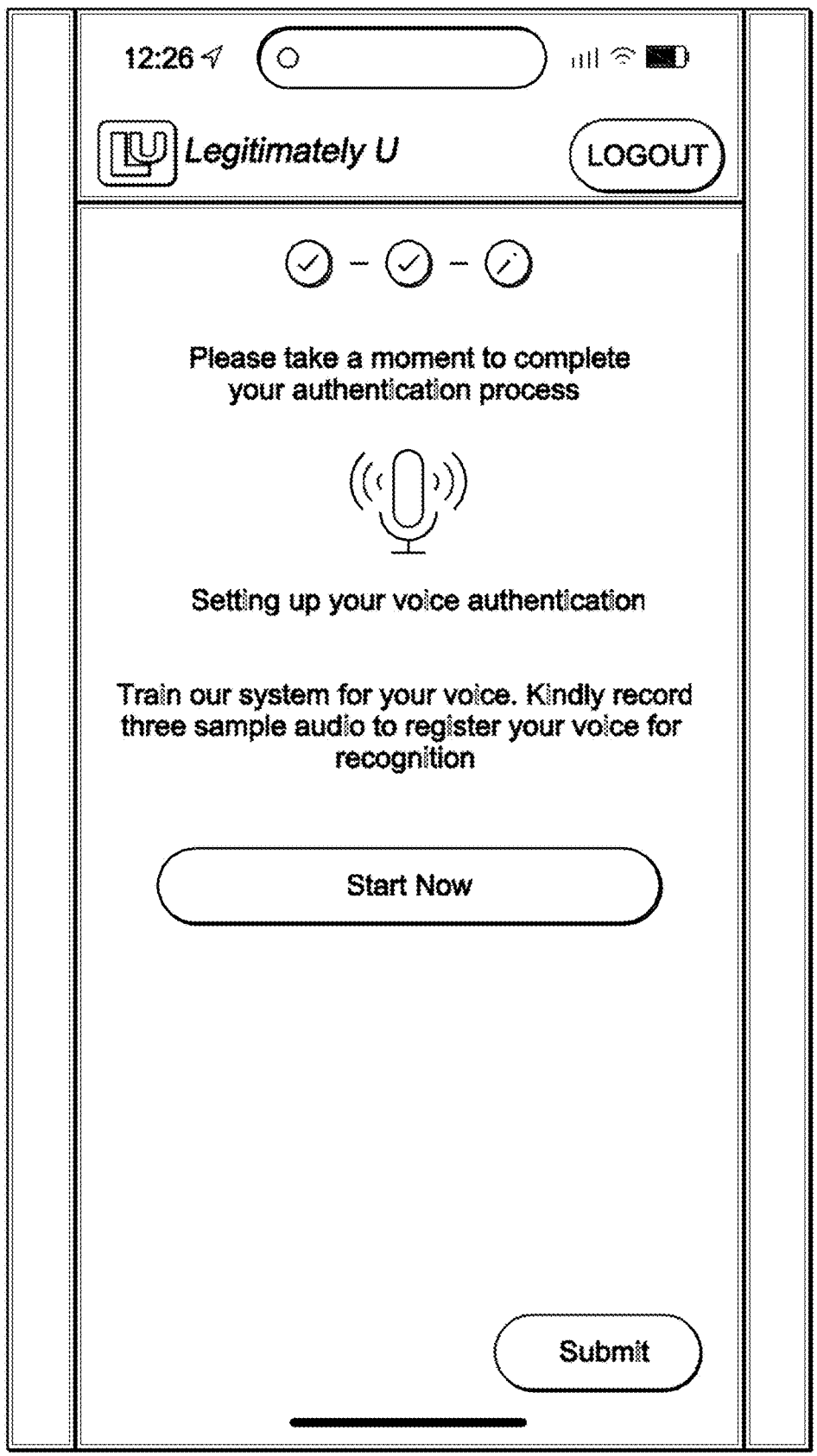

Thereafter, the authentication process is initiated, either automatically or in response to a USER or user's prompt. In embodiments, the authentication process can include, up to seven (7) or more different authentication methodologies including without limitation, facial recognition, iris and retinal recognition, pass code recognition, voice recognition, fingerprint verification, DNA verification and/or a desktop synchronization recognition. (FIG. 11). In some embodiments, the user is presented via the application product 110 with a "Begin Authentication" screen as shown in FIG. 11 requesting entry of additional data etc. Starting with Step 1, the user sets up a security code, password or, in some embodiments, a birthday code, and enters the code into the USER DEVICE 102 as shown in FIG. 12. In some embodiments, the birthday code may be substituted with any password selected by the USER or randomly generated via the authentication application 110. In Step 2, the facial recognition phase is initiated. (FIG. 13). In association with the facial recognition step, the camera of the USER DEVICE 102 is utilized to capture one or more images of the face so as to digitally map the face. In embodiments, the facial recognition phase may be a two-step process. In the first step, the camera of the USER DEVICE 102 is used/ accessed to obtain a photo of the face to generate digital data of the face. (FIG. 14) Thereafter, in association with the second step of the facial recognition, and responsive (in embodiments automatically) to the photo being taken and/or the image data collected and stored, the authenticator application 110 will prompt (e.g., automatically) the user to move while in the camera's line of sight. In embodiments, the authenticator application 110 will prompt the user to "Blink" as indicated and shown n FIG. 14. Upon confirmation of the blink or movement by the camera via the authenticator application, the facial recognition phase is complete. The blink or movement of the user as required by the authenticator application is another form of verification to prevent an unauthorized user from, for example, utilizing a photograph of the user to create/access/hack the account.

Figure 16:
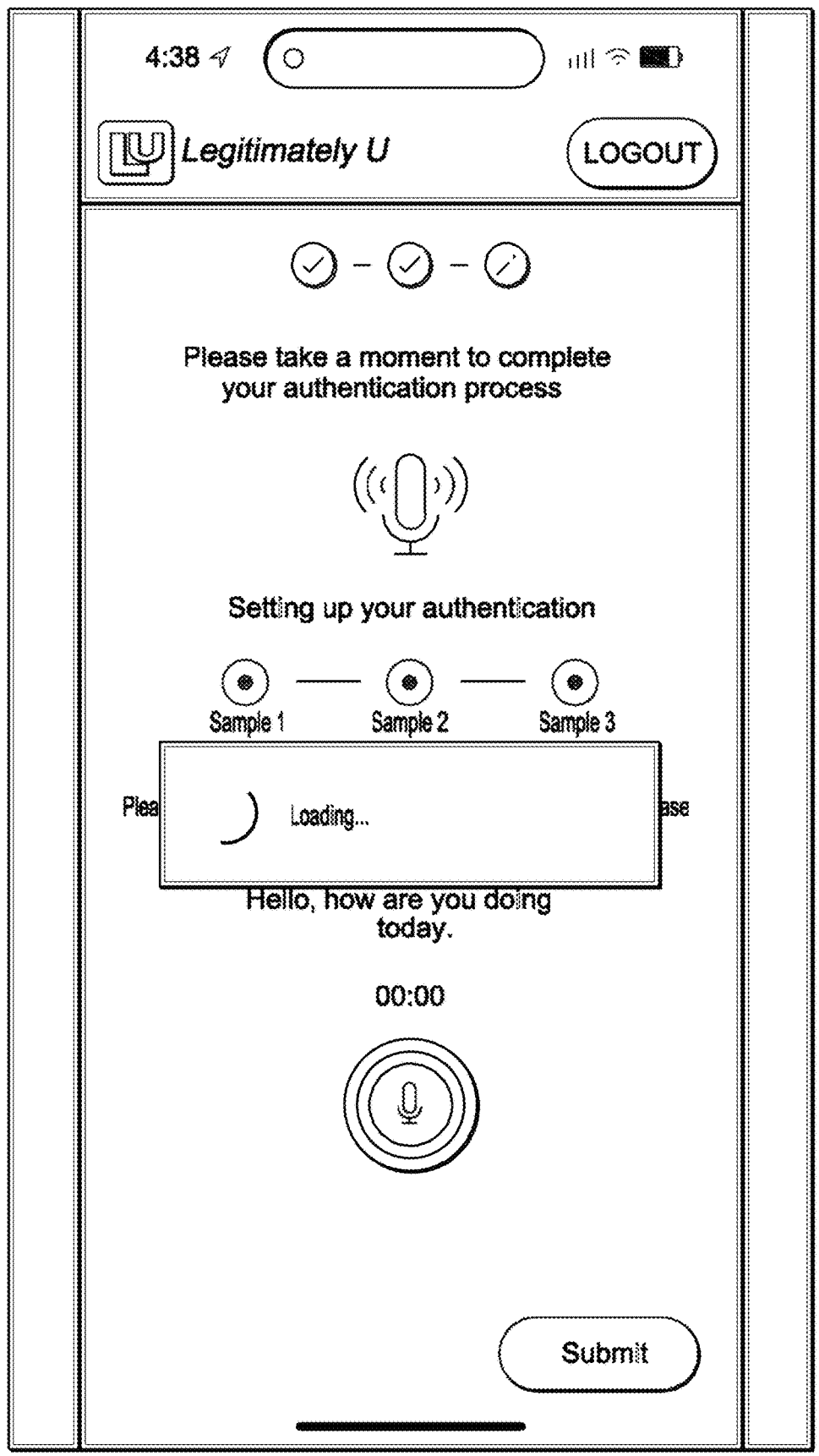

Step 3 of the authentication process involves a voice recognition process to authenticate the user's voice. (FIG. 15) This step may require the USER to enable access to the authenticator application 110 to the microphone and/or speaker of the USER DEVICE 102. In embodiments, voice authentication may require three (3) sub-steps or the repeating of three separate phrases into the microphone of the USER DEVICE 102. FIG. 16 illustrates the user speaking into the microphone of the USER DEVICE 102 and repeating a simple phrase which is captured by the microphone and the authenticator application 110. In embodiments, three (3) voice samples are captured by the microphone and the authenticator application 110. In the event, a sample phrase is misspoken by the user, for example, mispronounced or incorrectly repeated, the authenticator application 110 will automatically prompt the user to repeat the phrase. This process may be carried out as Step 4 captures your voice, when promoted, repeating any phase. Examples of simple phrases include "This is John Smith" "Today is a Sunny Day". In embodiments, the authenticator application 110 will randomly generate phrases taken from a database and/or randomly generated with, for example, artificial intelligence (AI).

Figure 17:
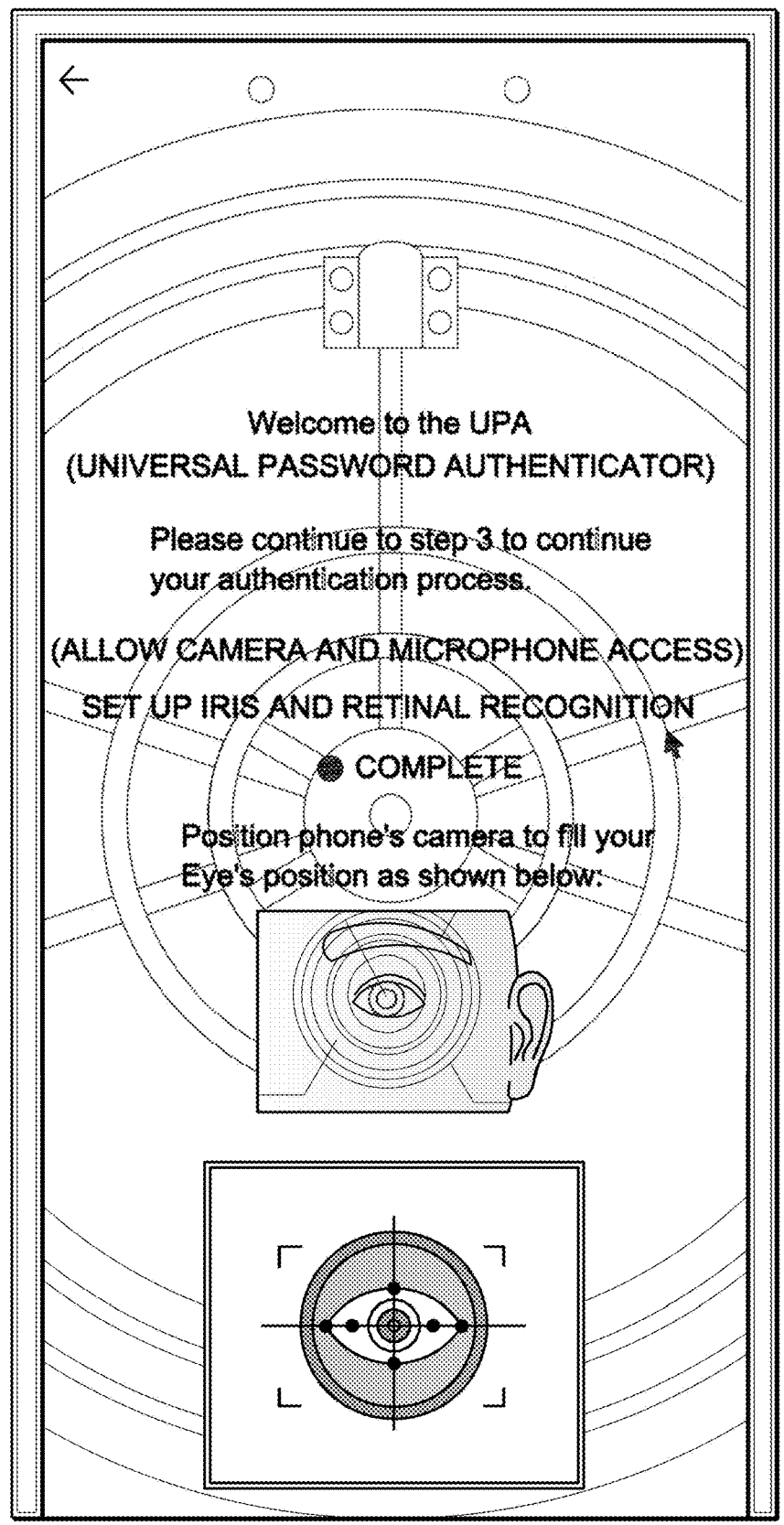

Steps 4 and 5 include setting up "IRIS" and "Retinal" scanning capabilities. These steps add additional layers of security as well as providing for easier accessibility and authentication while using products like apple vision and similar VR based eyewear, as they become more popular in the future. (FIG. 17). These steps may require the USER to enable access to the authenticator application 110 to the camera of the USER DEVICE 102. The camera is activated to enable sequential scanning and/or simultaneous scanning of the iris and the retina.

Step 6 includes a finger or thumbprint scanning process which can be effected on the IPHONE, smart phone or desktop computer in a manner which is similar to the scanning technologies (e.g., thumbprint scanning) currently used on these devices.

Other methodologies of authentication also can be utilized. In embodiments, the methodologies would require support by the specific USER DEVICE 102 used to authenticate with the selected methodology. In some embodiments, DNA biometrics may be utilized depending on the availability of such capabilities (including future technology to be developed) on the USER DEVICE 102. (Step 7 of the verification processes) DNA and ribonucleic acid are nucleic acids. DNA stores instructions for making other large molecules calling proteins. These instructions are stored inside each cell, and are distributed among 46 long structured chromosomes which are made up of genes having unique sequences or genetic codes. In current applications, DNA samples may be obtained by a cotton swab and analyzed via fluorescent spectroscopy. It is envisioned that the authenticator application 110 may use DNA biometric screening. In some embodiments, scanning software may be incorporated or associated with the USER DEVICE 102 to obtain DNA samples through a surface or interface. The software may be used to sequence the DNA strands and identify individual variants. These individual variants which are unique to each person may be analyzed by the authenticator application 110 or through a processor associated with the USER DEVICE 102 using a Bayesian algorithm or the like to compare the individual variants with a repository or library of collected variants. Cross checking and identification of the USER may be identified in short periods of time.

Figure 18:
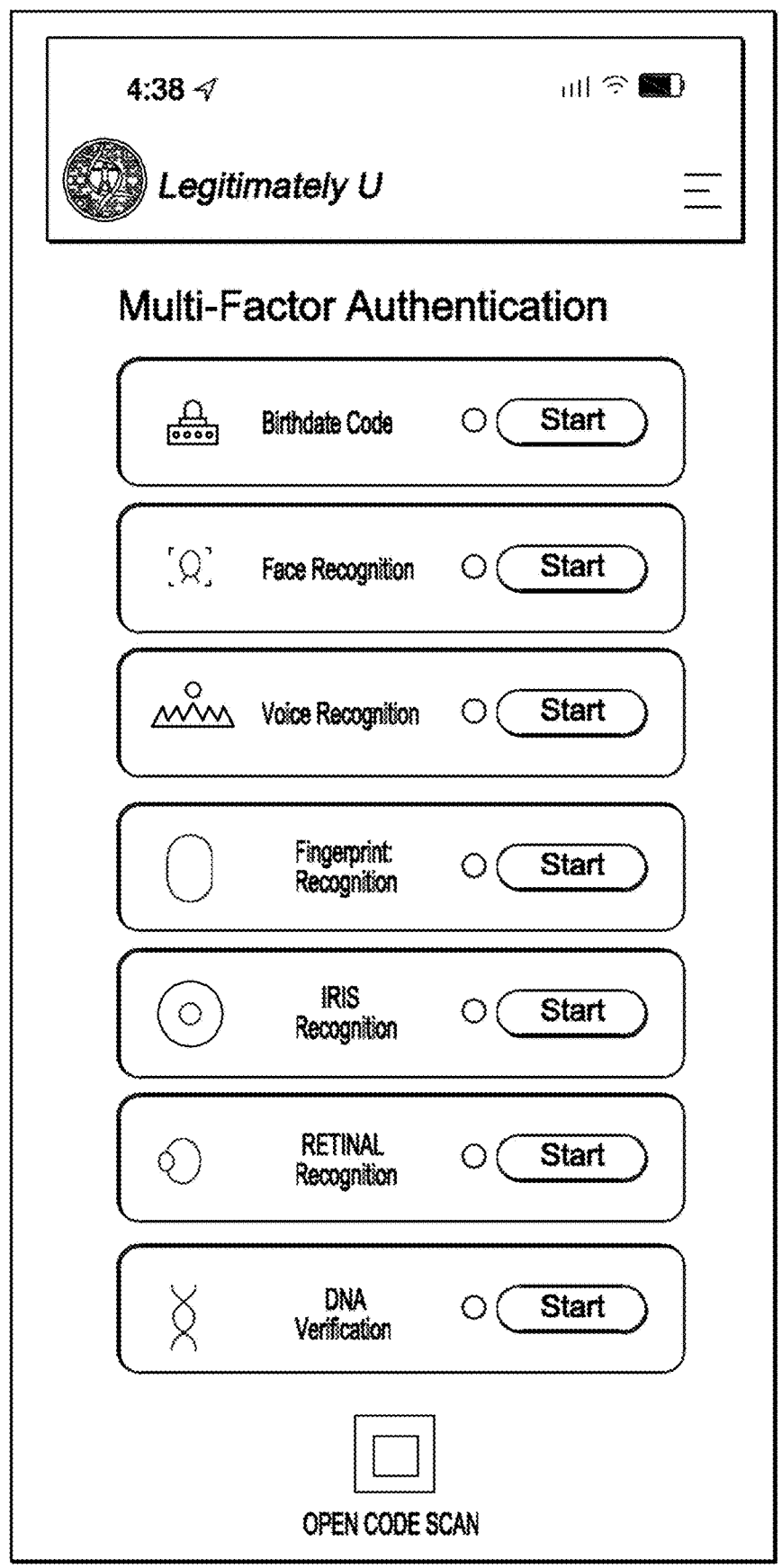
Figure 19:
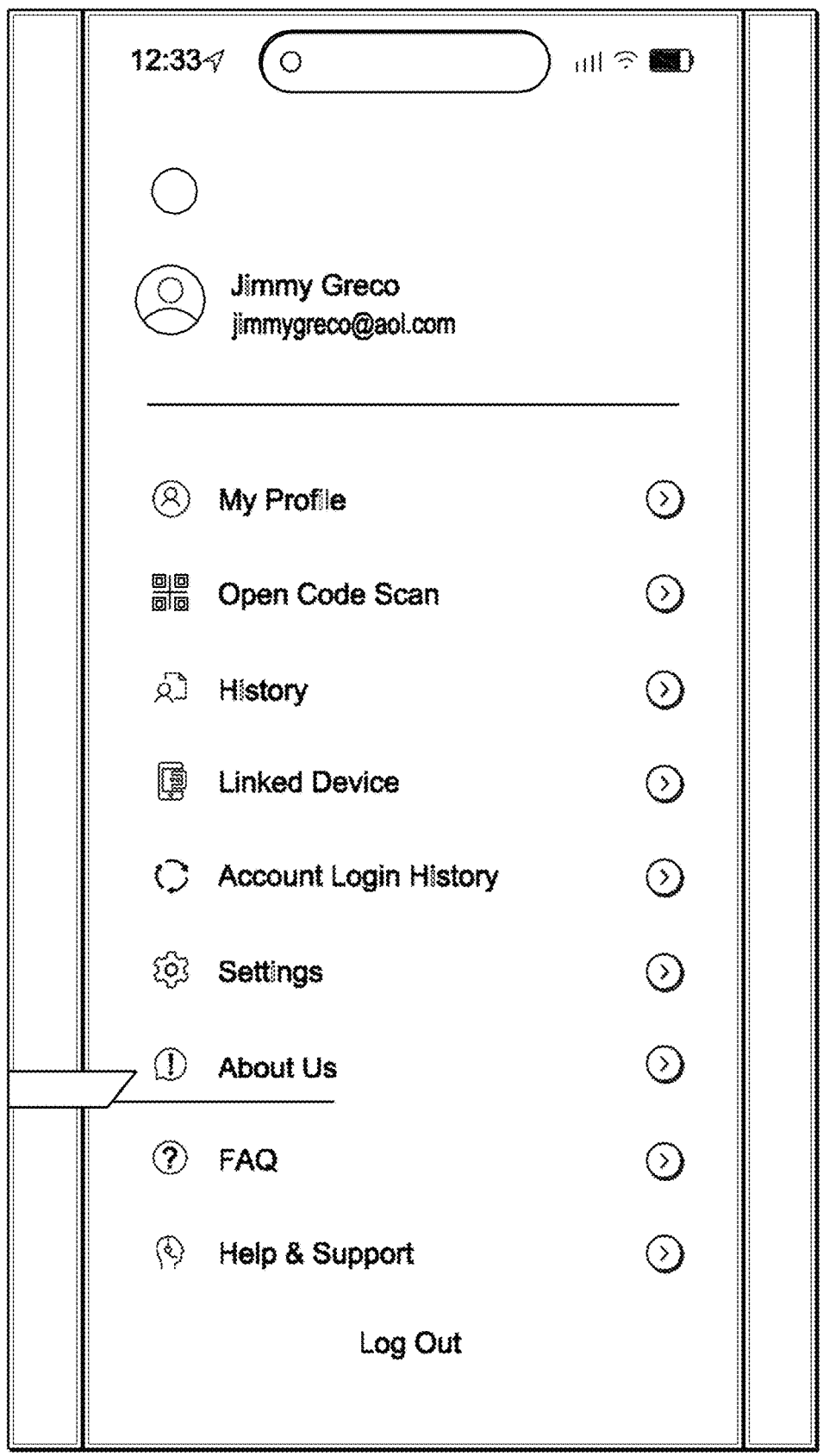
Figure 20:
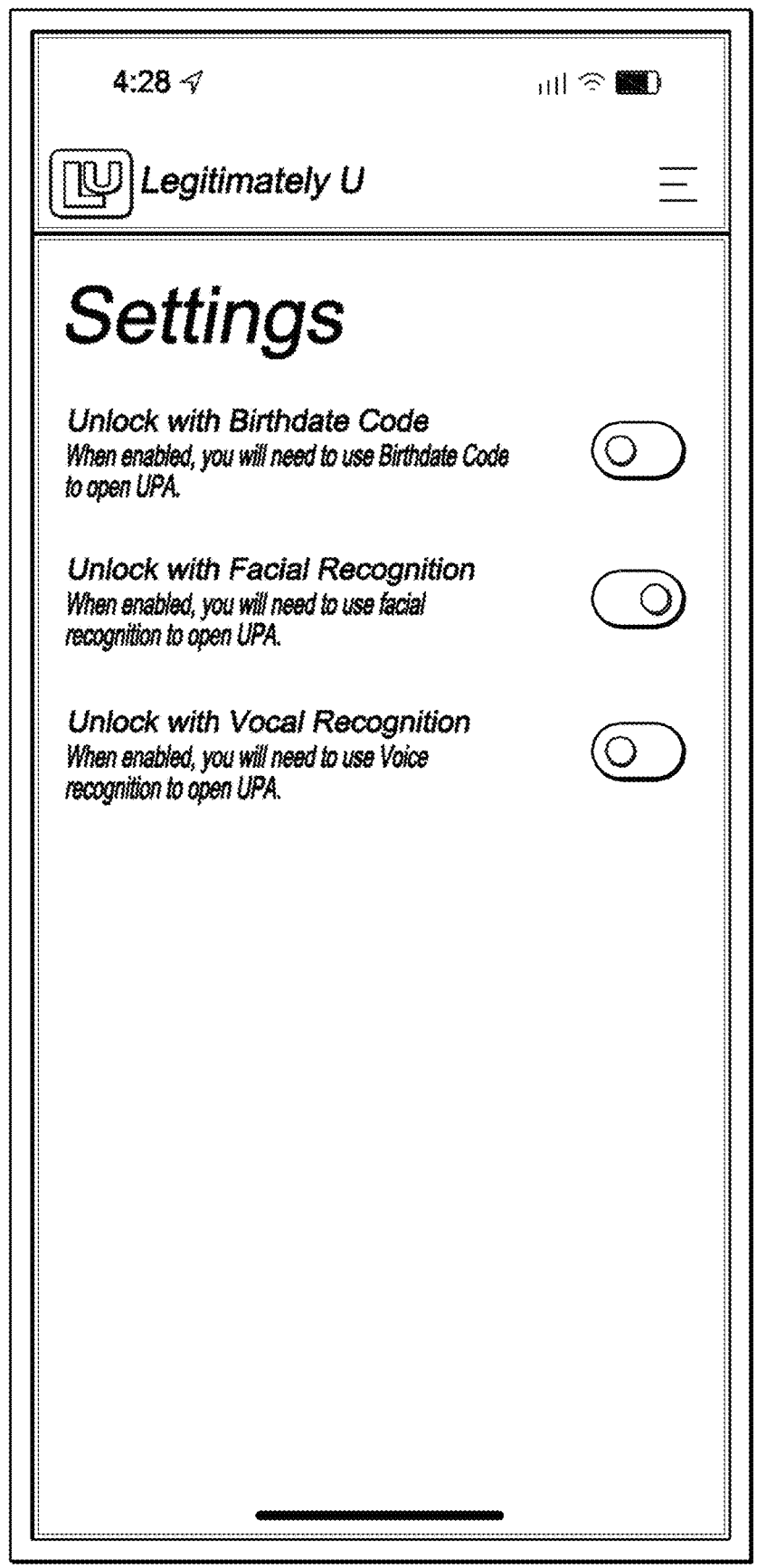

FIG. 18 illustrates the screen generated subsequent to each of the authentication processes or modalities being completed. The screen indicates that the all of the authentication processes are completed.

In embodiments, a unique USER ID is created upon completion of the verification processes. The unique USER ID may be stored in memory associated with the USER DEVICE 102, the compute nodes 108 and/or the authenticator application 110. The unique USER ID is unique to the USER and is, in embodiments, non-transferrable. In embodiments, the unique USER ID is not visible to the USER but is embodied in the stored data associated with the authenticator application 110. Thus, the USER may not transfer the unique USER ID to another user. In embodiments, the unique USER ID is recognized/transmitted by the authentication application 110 and/or the HOST SERVICE provider to ensure that the USER is registered with the services provided by the HOST SERVICE provider. In some embodiments, the unique USER ID or token is unique to the USER and the authenticator application 110, and may be used as a token for multiple HOST SERVICES to provide authorization that the USER is registered with the particular HOST SERVICES. In some embodiments, the HOST SERVICES are made aware of the unique USER ID, and us it for verification purposes. More specifically, the authenticator application 110 will generate a unique USER ID which will inform each HOST SERVICE provider that the individual utilizing the authenticator application 110 is the authorized user of the services of the HOST SERVICE provider. Thus, the user does not need to enter or remember a password for each HOST SERVICE. The password is embodied in the unique USER ID.

Thereafter, it is recommended to download the desktop and Tablet versions of the authenticator app to expand access to third party systems that require password access.

Now that the verification process is complete as represented in the view of FIG. 18, accessing the authenticator application 110 will make it easy for the user to confirm identity and facilitate secure authentication with the HOST SERVICE provider when it's required. Once the authentication process is complete, the authenticator application 110 will enable the scanning of a QR code associated with the particular service to be accessed. In some embodiments, the "Open Code Scan" will be an option prompted on a menu associated with the authentication application upon completion of the verification process as shown in FIG. 18. Selection of the "Open Code Scan" will cause the camera or imaging means to open to enable scanning of a visual indicia or QR code on the screen of a smart device displaying the sign-in page of the particular HOST SERVICE.

The authenticator application 110 (Legitimately U app) provides other functionalities. For example, with reference again to FIG. 19, on a main screen of the authenticator application 110, the USER may view and/or update various information and protocols associated with the authenticator application 110. For example, under the "My Profile" subheading, the demographic data entered and authentication processes are identified. In embodiments, the USER may select the desired authentication process or may select multiple authentication processes to be used upon sign-in. (FIG. 20) In some embodiments, multiple methodologies may be selected by the USER. For example, for financial services multiple authentication methodologies may be warranted or selected for added protection. Some USER DEVICES may not have all of the verification capabilities. For example, an IPHONE is devoid of iris scanning while a SAMSUBG GALAXY includes such capabilities. A smart phone such as the IPHONE and a desktop computer may have fingerprint scanning. As technologies of the USER DEVICE 102 develops, the authenticator application 110 will enable utilization of the authentication processes. The "History" subheading will enable the USER to visit the history of use of the authenticator application 110. The Linked Device subheading will show the linked devices of the authenticator application 110. It is envisioned that all Apple devices may be linked including I-PHONE, I-AD MACS, MacBooks or the like. Other devices may also be linked. In the "Login Activity" subheading will illustrate the current status of the USER DEVICE 102 and also historical use and potentially attempts of unauthorized users. The "Settings" subheading will identify the authentication processes registered with the USER DEVICE 102 and enable the USER to select one or more authentication processes. The other subheadings include "About Us", "FAQ" and "Help & Support."

Figure 21:
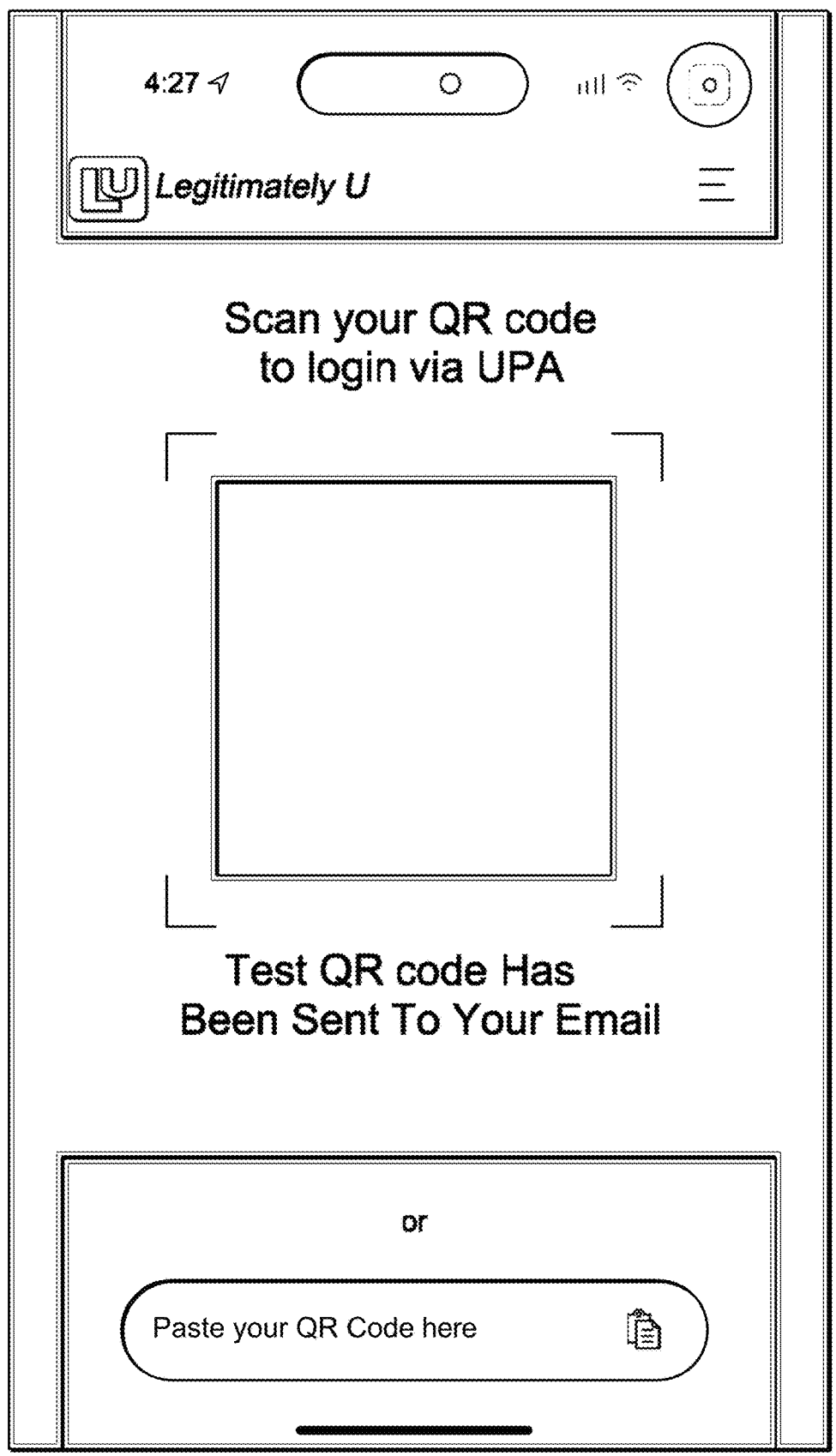
Figure 22:
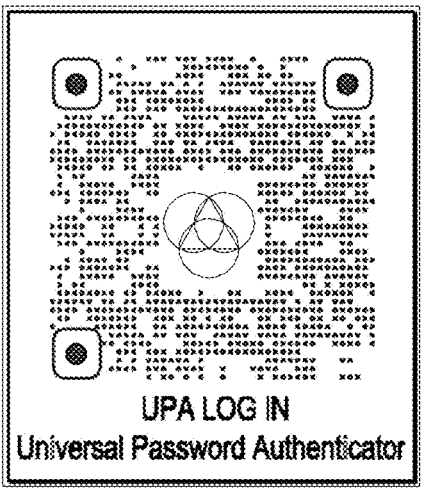

The "Open Code Scan" subheading will open the QR code scanner as shown in FIG. 21 enabling the scanning of the QR code forwarded to the smart device for the particular service of the HOST SERVICE PROVIDER (e.g., NETFLIX or a financial institution) With the "Open Code Scan" function actuated, the USER can scan a QR code generated on the smart TV, desktop application, to access the particular service (e.g., NETFLIX). In some embodiments, the scanner of the USER DEVICE 102 will be opened by the HOST SERVICE provider responsive to verification of the unique CLIENT ID by the HOST SERVICE provider.

An example of an illustrative process is as follows. One or more HOST SERVICES are registered with the authenticator application 110 as described in connection with the processes of FIG. 2. Thereafter, a HOST SERVICE is selected on the USER DEVICE 102 (STEP 306 of FIG. 3) For example, the selected HOST SERVICE may be NETFLIX. The authenticator application 110 communicates with the HOST SERVICE provider and sends/transmits the unique CLIENT ID associated with the USER. The HOST SERVICE provider verifies the unique CLIENT ID and sends a "QR CODE" to the screen of the smart device or TV 500 via the authenticator application 110. (FIG. 22) The particular smart TV or device may have been previously registered with the authenticator application 110, and recognized by the HOST SERVICE provider.

Figure 23:
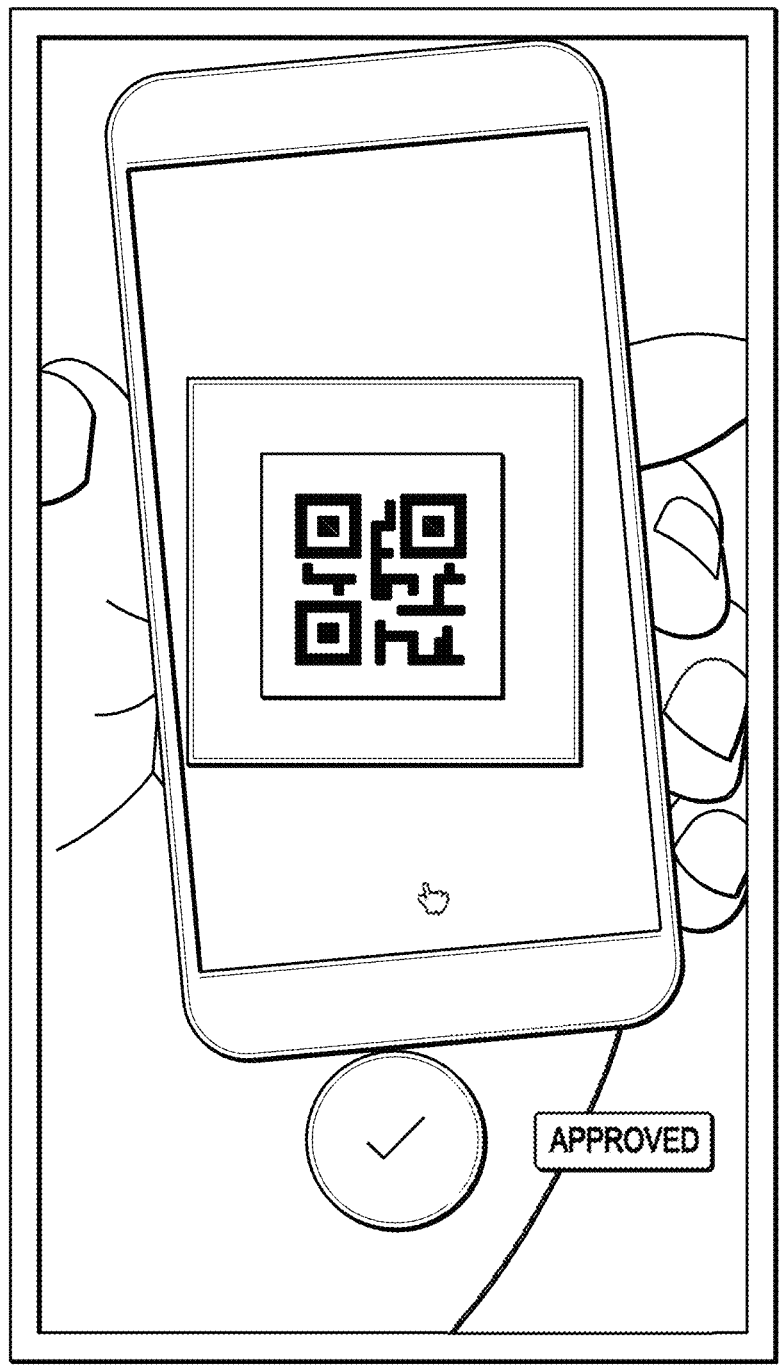
Figure 24:
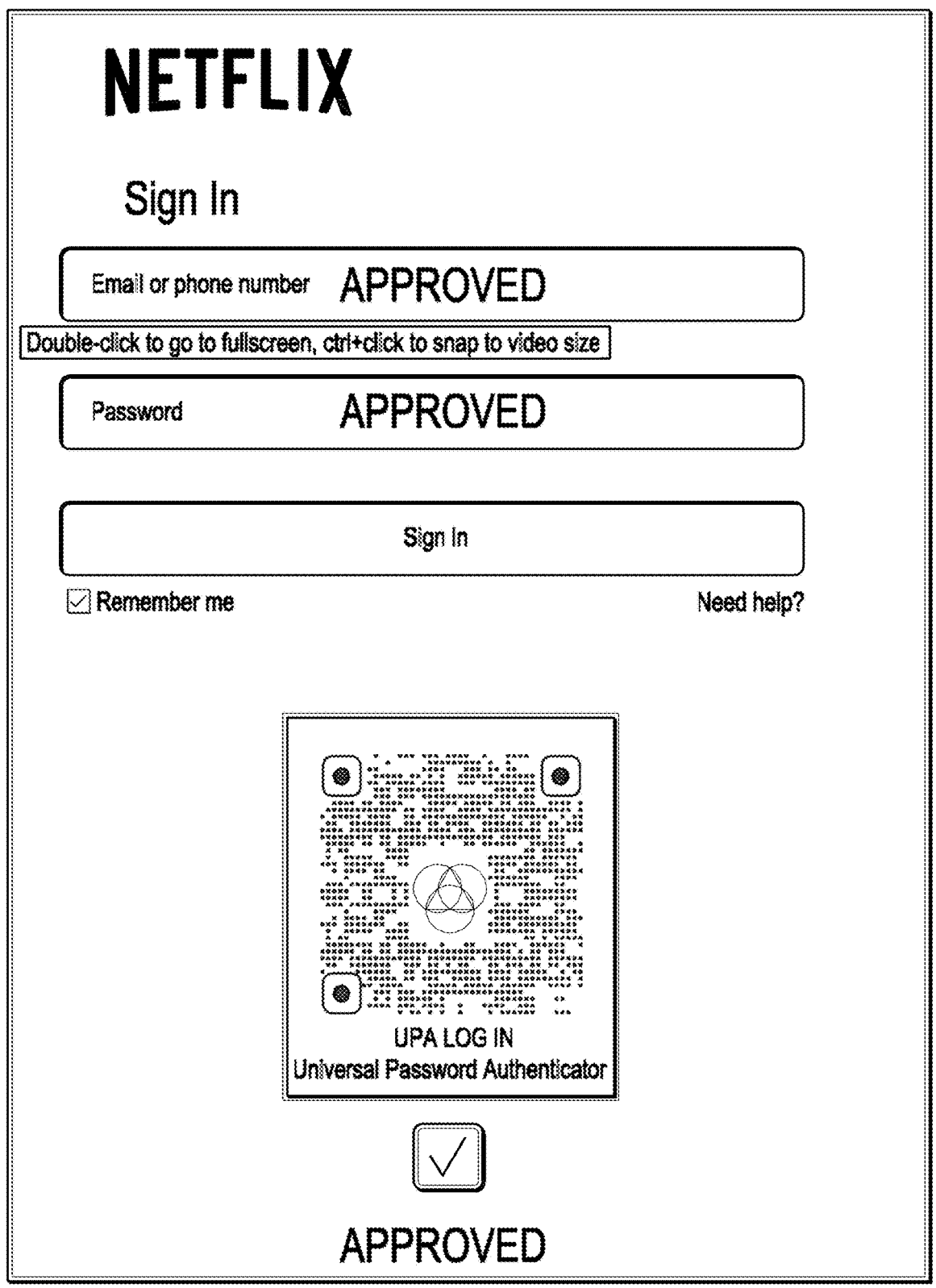

The USER DEVICE 102 is then used to take a photo or scan of the QR code (FIG. 23). For desktop applications, the QR code is taken and pasted into the authentication application 110 on the desktop. For a mobile phone, the camera is accessed to scan the QR code. Upon scanning of the QR code, the HOST SERVICE provider approves/verifies the USER and subscription to the services makes the services available to the USER as shown in FIG. 24.

Figure 25:
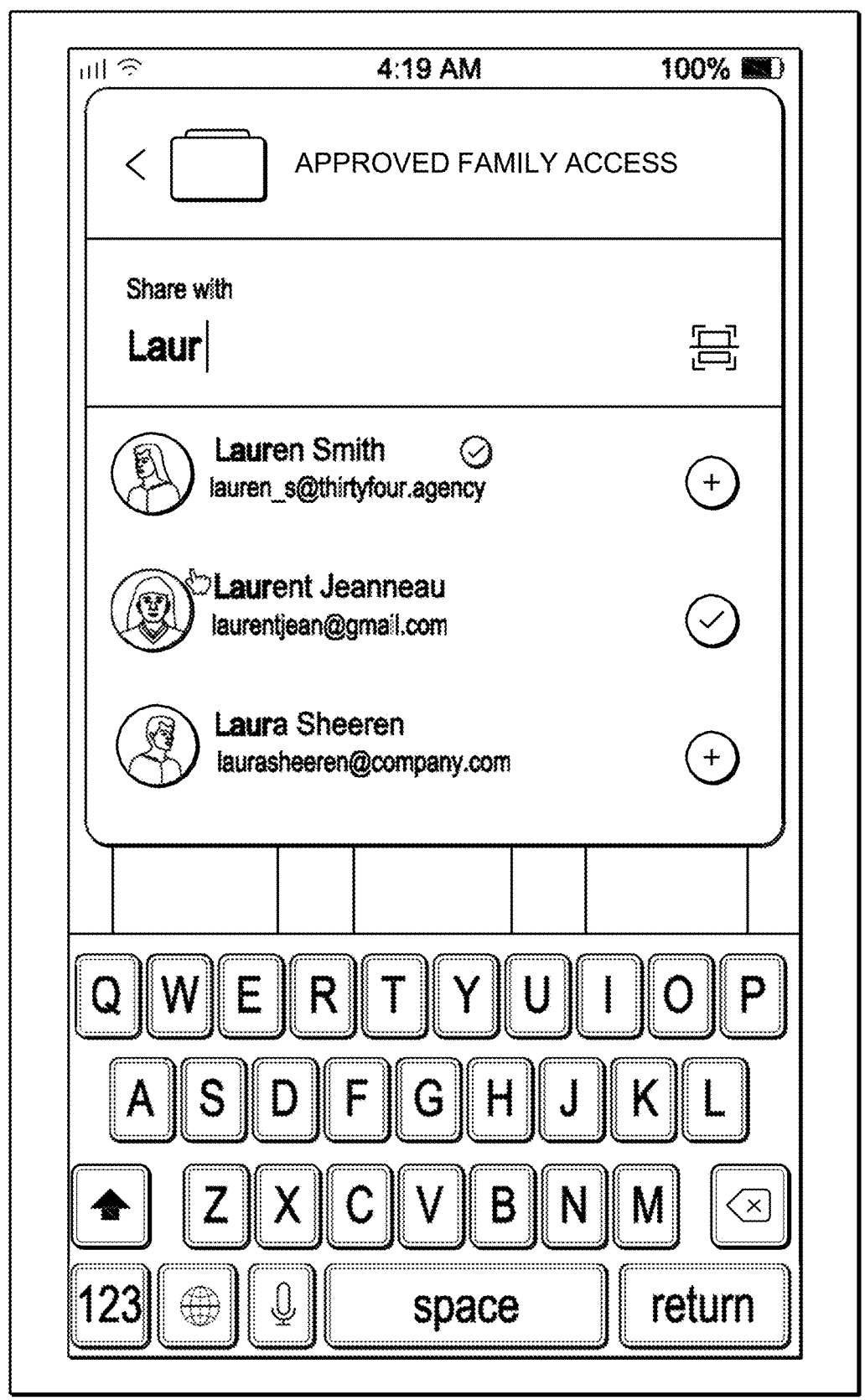

In embodiments, sharing access with your family is also envisioned by adding family members, and granting access for selected password authentication requests. (FIG. 25).

End-to-end encryption by contrast provides the gold standard for protecting communication. In an end-to-end encrypted system, the only people who can access the data are the sender and the intended recipient(s)—no one else. Neither hackers nor unwanted third parties can access the encrypted data on the server)

In addition, there is an "Off Line" option for moments where password authentication is needed but there is no WIFI or connection to main server. This option will only work if the verified device had previously been paired and verified with the requesting application such as (Netflix log in, previously approved) for example.

The authenticator application 110 or "Legitimately U" APP will be used for numerous applications such as Banking, Healthcare, Subscription services and simply all areas where a secure, and accurate authentication of an identity is required. It's becoming more common for companies like Netflix and Apple to use their internal verification capabilities paired with email or SMS forms of verification to access their accounts. However they all function through the use of their individual internal systems. That means each user must still rely on the process of having to remember numerous passwords for accounts across multiple companies. (Apple account with password) Netflix account with email and password etc.)

Thus, the authenticator application 110 is a component of a system which integrates access to multiple HOST SERVICES without requiring individual password entry for each HOST SERVICE prior to its use. In embodiments, verification is effected through scanning of visual indicia or QR code with a USER DEVICE of the USER which QR code is displayed on a smart device. Moreover, the authenticator system and methodology provides at least the following advantages:

1. May eliminate or minimize the use of individual HOST SERVICES
2. Assist in identifying fraud or unauthorized use and/or identity theft.
3. Enhances security for USER USERS and HOST SERVICE providers.

In addition, the one verified access point via the authenticator application 110 to multiple HOST SERVICES as provided by the system and methodology of the present disclosure provides additional protection to each user or USER. Moreover, users need not enter the password for each HOST SERVICE which enhances password security and minimizes user identity to malicious third parties. In addition, the system and methodology will provide for better data management and collection capabilities for each HOST SERVICE provide in that use of each HOST SERVICE by a USER is monitored and tracked via the authenticator application 110.

Protecting the identity of the USER and having to remember numerous passwords for all the applications used is becoming more and more difficult. The present disclosure is directed to a Legitimately U or authenticator application 110 that is easy to use, delivers superior security and has the ability to be used on multiple platforms. The Legitimately U app enables a user to authenticate his/her identity and gain access through the user's mobile phone or smart device app. The Legitimately U app will allow the USER DEVICE of a USER to communicate with a secure central system that authenticates the user's identity.

Figure 26:
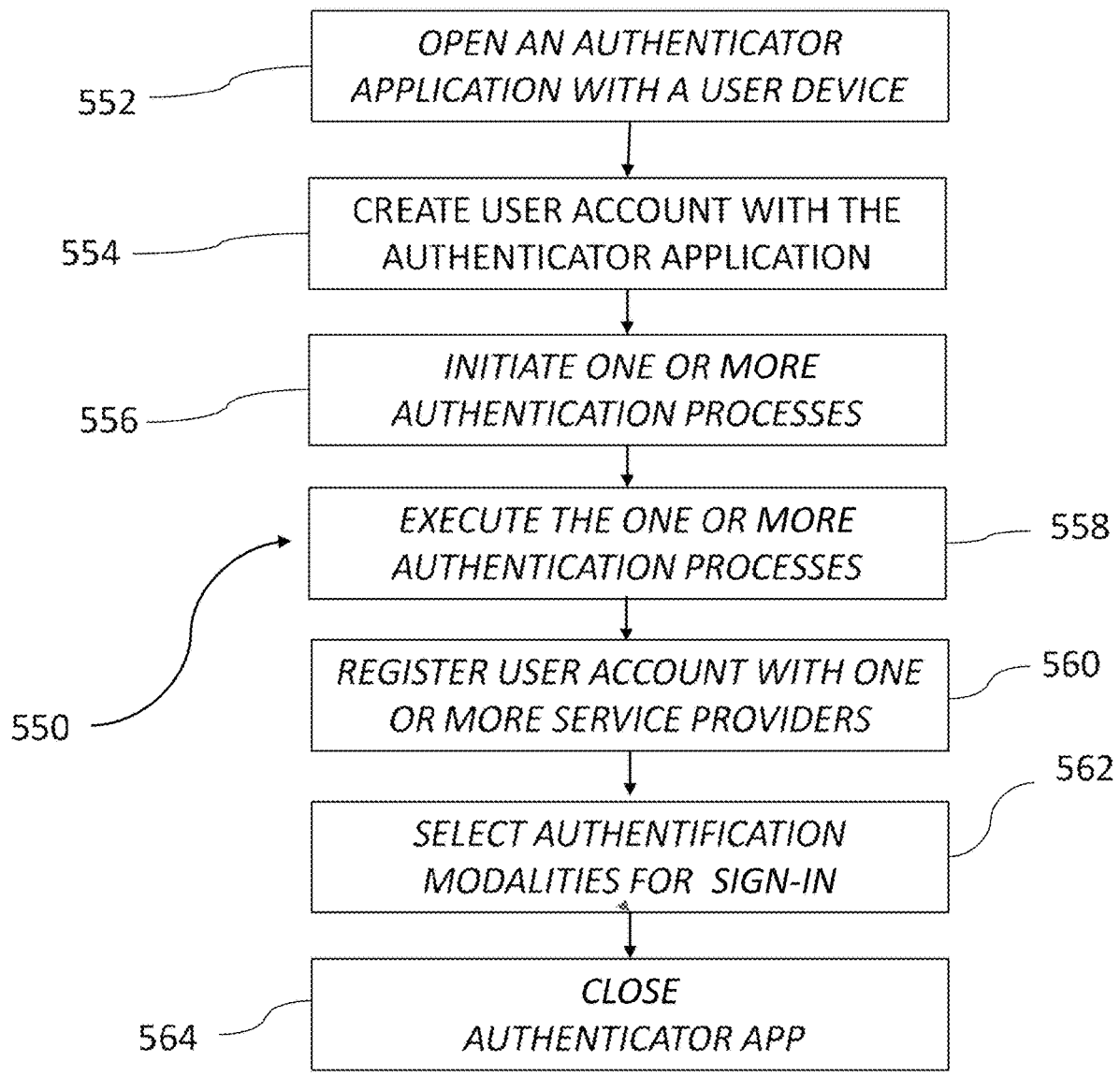
FIG. 26 is a flow chart illustrating an exemplative use of the system and method in accordance with one or more embodiments of the present disclosure.

FIG. 26 illustrates an exemplary illustrative use of the present disclosure. The flow chart or process 550 includes opening the authenticator application product with a USER DEVICE 102. (STEP 552). The authenticator application 110 may be accessed via the web via a web address and/or downloaded onto the USER DEVICE 102 as an "APP". In STEP 554, a user account is created by the USER via entry of some demographic data of the USER including phone number, e-mail address etc. Thereafter, one or more authentication processes associated with the authenticator application 110 is initiated. (STEP 556). The one or more authentication processes include at least one of passcode recognition, facial recognition, voice recognition, fingerprint recognition, iris recognition, retinal recognition or DNA recognition. The authentication processes are executed. (STEP 558). Upon completion of the authentication processes, the account is effected resulting in the generating of a unique user ID for the user account. The account is registered with one or more HOST SERVICES who are given access to the unique user ID. (STEP 560). The USER may then select one or more authentication modalities for accessing the account in subsequent "sign ins" to the account. (STEP 562). Thereafter, the authenticator application 110 may be closed. (STEP 564)

Figure 27:
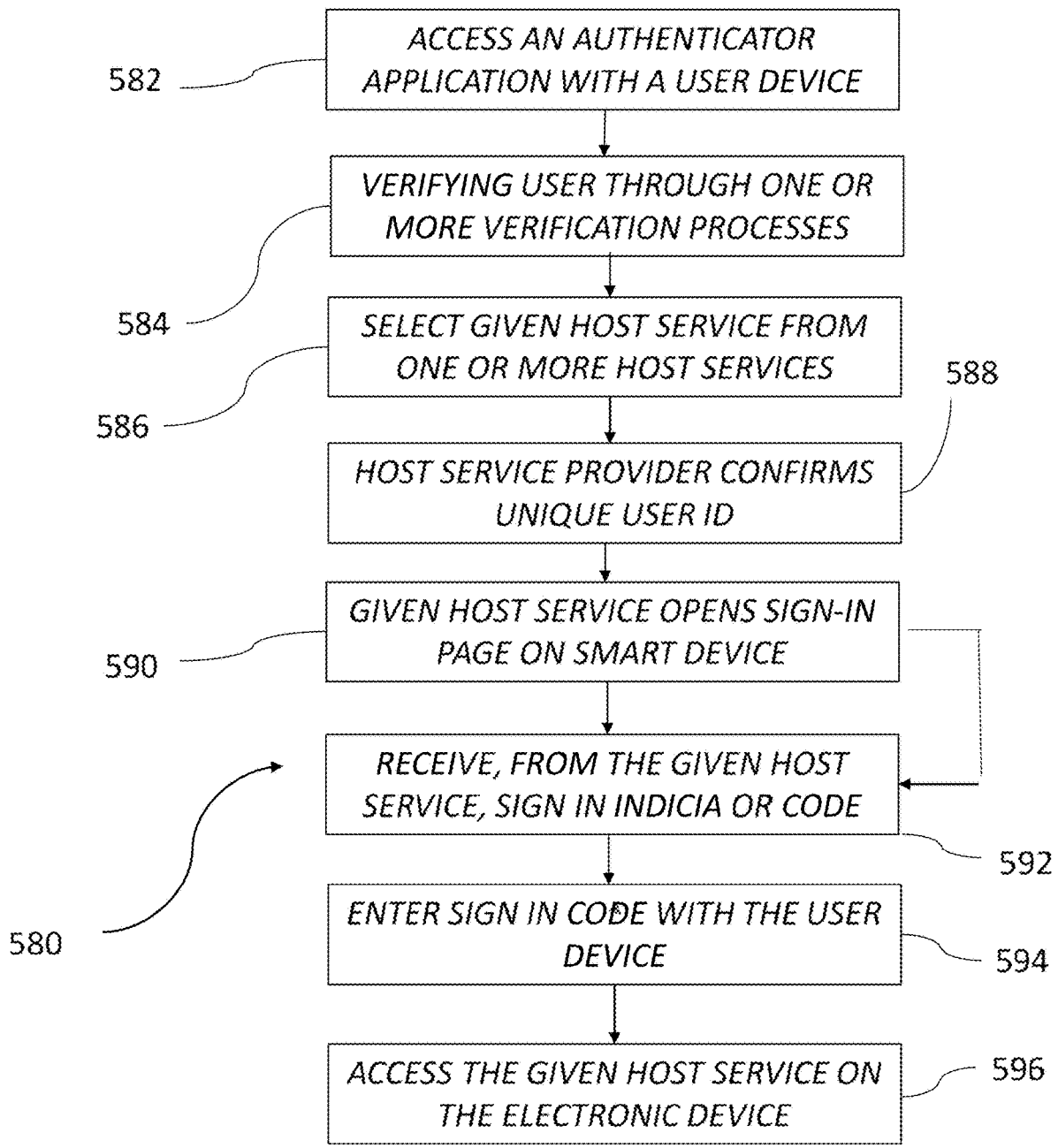
FIG. 27 is a flow chart illustrating an exemplative use of the system and method in accordance with one or more embodiments of the present disclosure.

FIG. 27 illustrates an exemplary illustrative use of the present disclosure. The flow chart or process 580 includes accessing the authenticator application 110 with the USER DEVICE 102. (STEP 582). The authenticator application may be accessible through a web address or via an "APP" previously downloaded onto the USER DEVICE 102. The USER may be already registered by the USER or may be registered subsequent to access. IN STEP 584, the USER of the authenticator application 110 is verified through one or more verification processes previously registered by the USER in the authenticator application 110. The one or more verification processes may include at least one of passcode recognition, facial recognition, voice recognition, fingerprint recognition, iris recognition, retinal recognition or DNA recognition product. In STEP 586, a given HOST SERVICE from one or more HOST SERVICES registered with the authenticator application product is selected by the USER. In embodiments, a unique USER ID for the user account to the given host service is forwarded to the given HOST SERVICE who has knowledge of the unique USER ID. The HOST SERVICE provider verifies the unique USER ID. (STEP 588) Thereafter, or simultaneously therewith, the HOST SERVICE provider optionally may automatically open it's login or sign-in page on the registered smart device or TV. (STEP 590). Sign in indicia or code is received from the given HOST SERVICE, i.e., the given HOST SERVICE transmits the indicia upon confirmation that the USER is indeed the registered user for the given HOST SERVICE. (STEP 592). The sign in indicia or code is displayed on an electronic or smart device capable of executing the given host service Thereafter, using the USER DEVICE 102, for example, the scanner, camera or imaging means the visual indicia in the form of for example a QR code is entered by the USER DEVICE 102. (STEP 594). In embodiments, the HOST SERVICE provider has access to the camera, scanner or imaging device of the USER DEVICE and opens up the device (e.g., automatically) in response to confirmation of the unique USER ID. Once the QR code is scanned, the HOST SERVICE provider provides the services to the USER on the smart device. (STEP 596).

Figure 28:
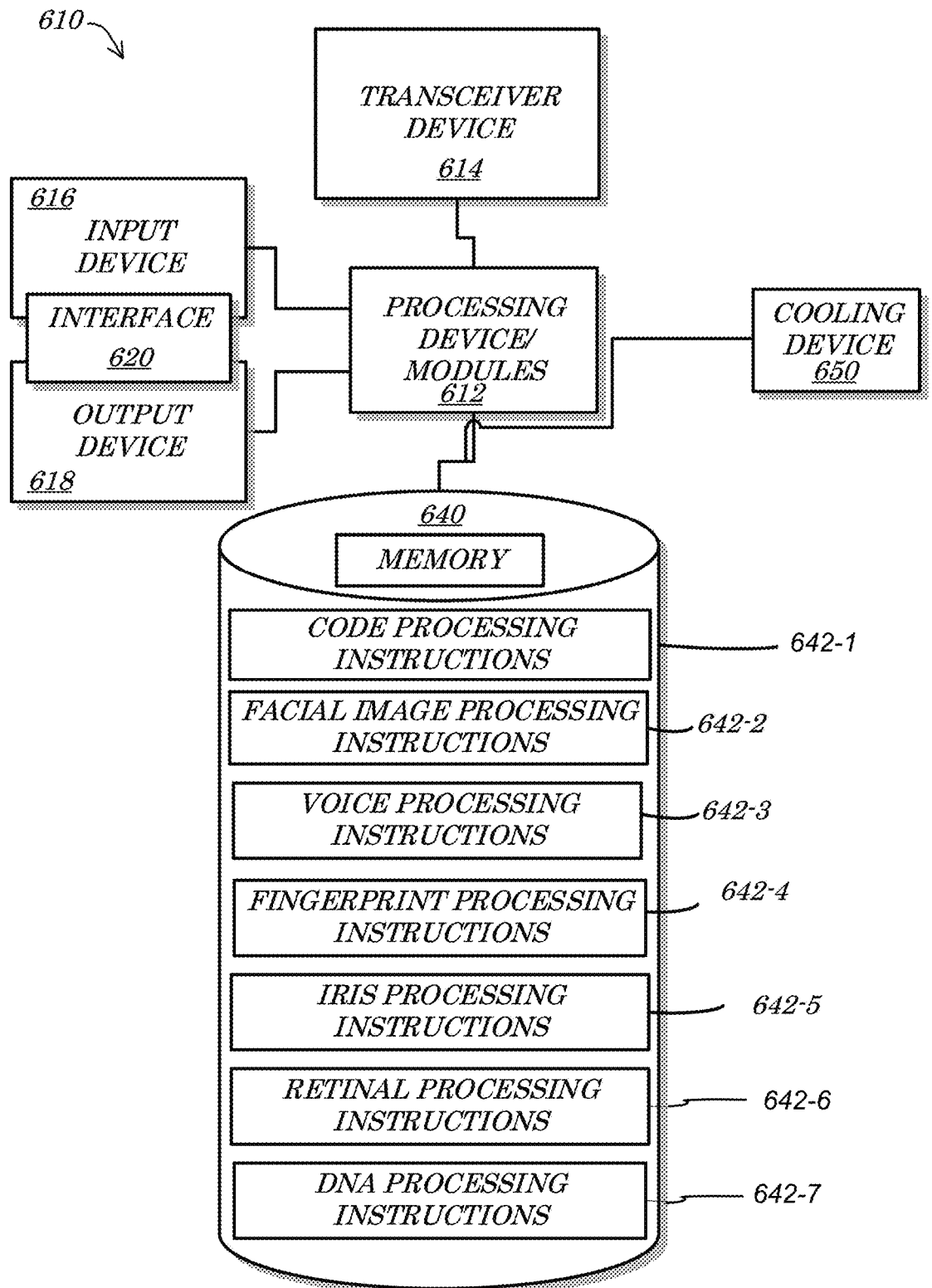
FIG. 28 is a block diagram of an apparatus according to some embodiments.
Figure 29A:
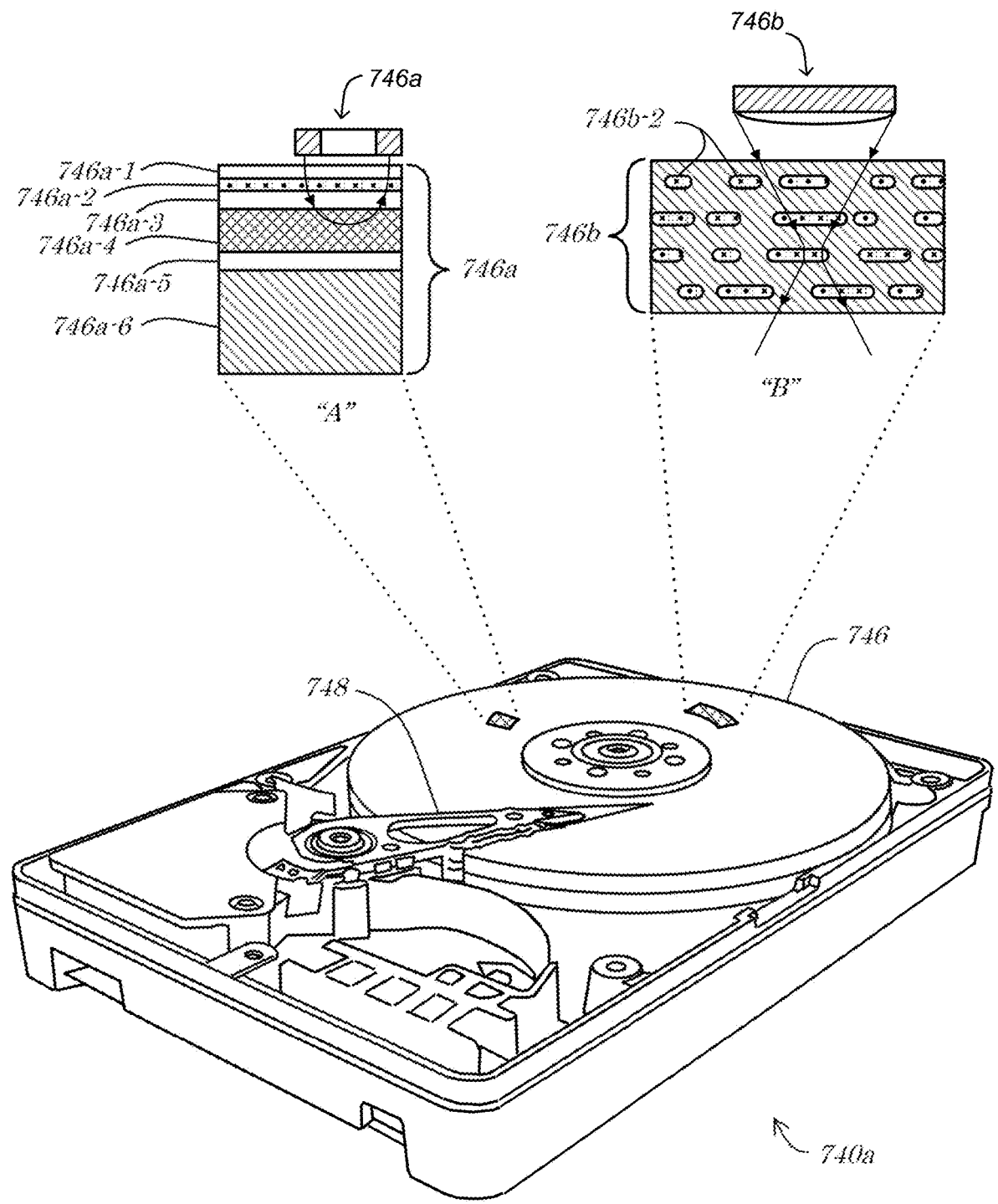
FIG. 29A, FIG. 29B, FIG. 29C, FIG. 29D, and FIG. 29E are perspective diagrams of exemplary data storage devices according to some embodiments.
Figure 29B:
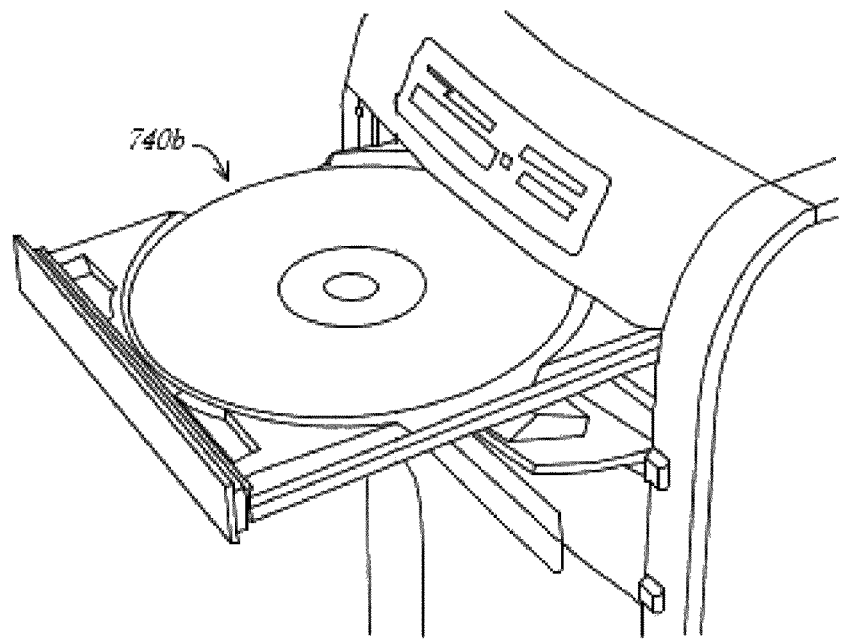
Figure 29C:
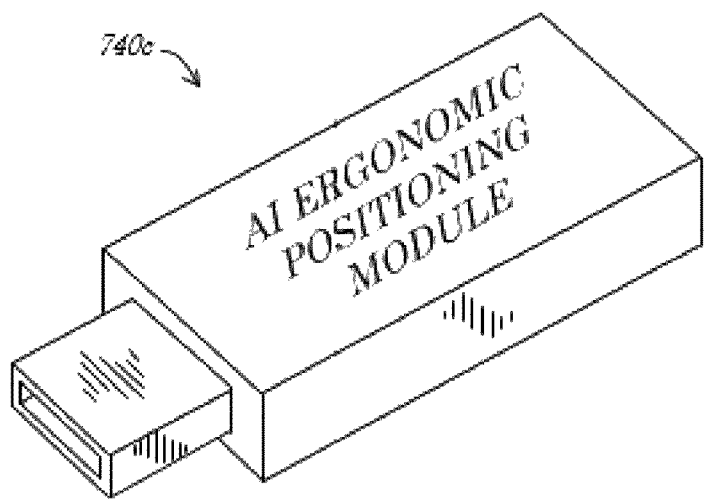
Figure 29D:
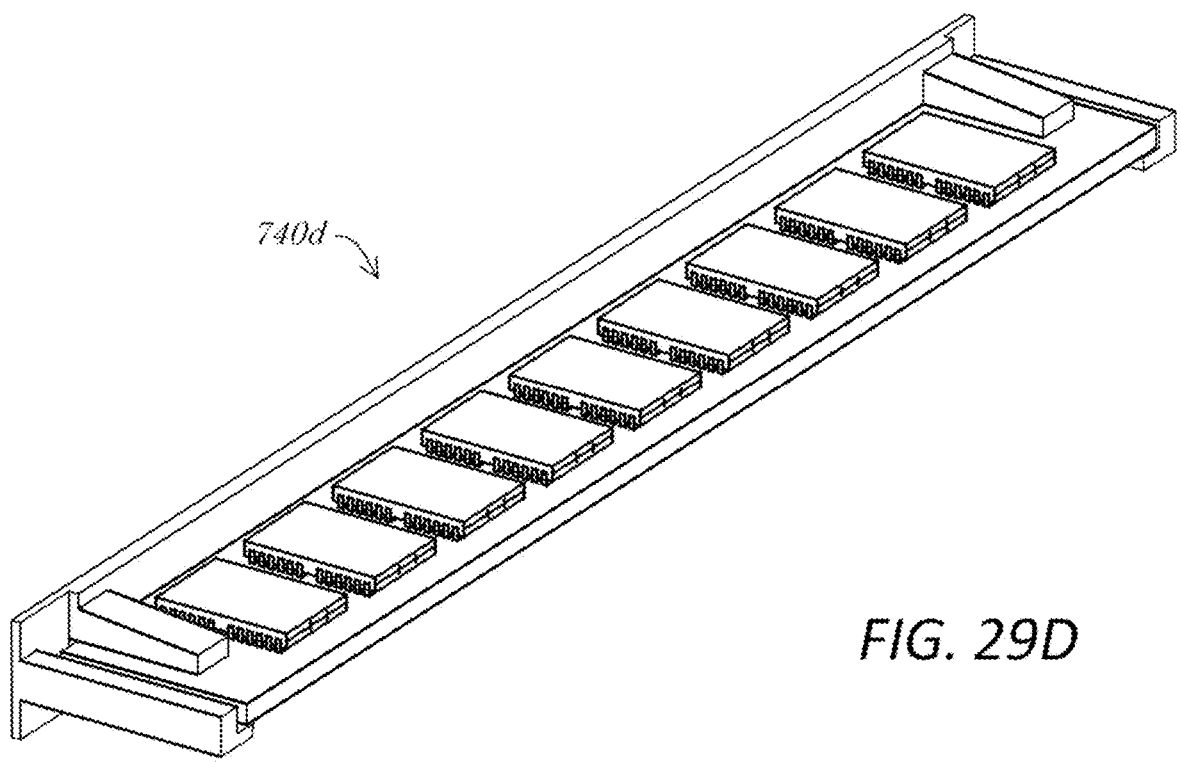
Figure 29E:
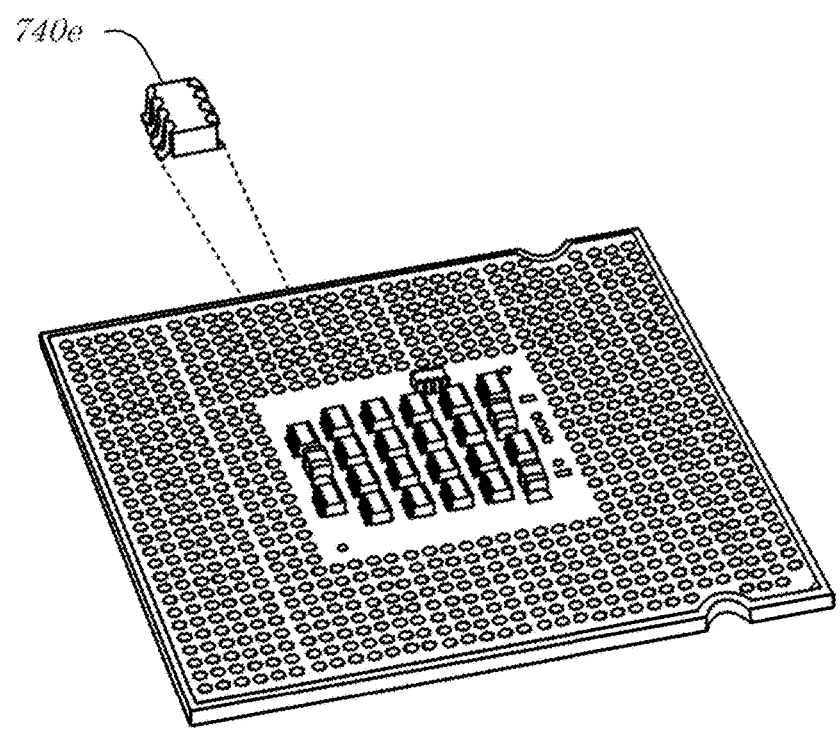

Turning now to FIG. 28, a block diagram of an apparatus 610 according to some embodiments is shown. In some embodiments, the apparatus 610 may be embodied in the USER DEVICES 102 described hereinabove or may be similar in configuration and/or functionality to one or more of the USER DEVICES 102. The apparatus 610 may, for example, execute, process, facilitate, and/or otherwise be associated with the methods 200, 300, 500, 550 of FIGS. 2, 3, 26, 27 respectively of the authenticator application 110 and the steps associated with FIGS. 5-25, and/or portions thereof. In some embodiments, the apparatus 610 may comprise a processing device 612 having one or more modules/components, a transceiver device 614, an input device 616, an output device 618, an interface 620, a memory device 640 for storing various programs and/or instructions, and/or a cooling device 650. Fewer or more components 612, 614, 616, 618, 620, 640, 642, 650 and/or various configurations of the components 612, 614, 616, 618, 620, 640, 642, 650 be included in the apparatus 610 without deviating from the scope of embodiments described herein.

According to some embodiments, the processor 612 may be or include any type, quantity, and/or configuration of processor that is or becomes known. The processor 612 may comprise, for example, an Intel® IXP 2800 network processor or an Intel® XEON™ Processor coupled with an Intel® E6501 chipset. In some embodiments, the processor 612 may comprise multiple interconnected processors, microprocessors, modules and/or micro-engines. According to some embodiments, the processor 612 (and/or the apparatus 610 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 610 comprises a server, such as a blade server, necessary power may be supplied via a standard AC outlet, power strip, surge protector, and/or Uninterruptible Power Supply (UPS) device.

In some embodiments, the transceiver device 614 may comprise any type or configuration of communication device that is or becomes known or practicable. The transceiver device 614 may, for example, comprise a Network Interface Card (NIC), a telephonic device, a cellular network device, a router, a hub, a modem, and/or a communications port or cable. According to some embodiments, the transceiver device 614 may also or alternatively be coupled to the processor 612. In some embodiments, the transceiver device 614 may comprise an IR, RF, Bluetooth™, Near-Field Communication (NFC), and/or Wi-Fi® network device coupled to facilitate communications between the processor 612 and another device (not shown).

According to some embodiments, the input device 616 and/or the output device 618 may be communicatively coupled to the processor 612 (e.g., via wired and/or wireless connections and/or pathways) and they may generally comprise any types or configurations of input and output components and/or devices that are or become known, respectively. The input device 616 may comprise, for example, a keyboard that allows an operator of the apparatus 610 to interface with the apparatus 610 (e.g., a user, such as to initiate and/or review AI-based ergonomic analysis and/or positioning activities, as described herein) and/or may comprise one or more workspace objects having input capabilities (e.g., a mouse device, keyboard, wearable device, etc.). The output device 618 may, according to some embodiments, comprise a display screen, GUI and/or other practicable output component and/or device, such as one or more workspace objects having output capabilities (e.g., a mouse device, keyboard, wearable device, etc.). The output device 618 may, for example, provide an interface (such as the interface 620) via which AI ergonomic analysis, positioning, assessment, and/or other data or information is provided to a user (e.g., via a website and/or mobile application). According to some embodiments, the input device 616 and/or the output device 618 may comprise and/or be embodied in a single device, such as a touch-screen monitor or display.

The memory device 640 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of code/birthday/passcode processing instructions 642-1, facial image processing instructions 642-2, voice processing instructions 642-3, fingerprint processing functions 642-4, iris processing functions 642-5, retinal processing functions 642-6 and DNA processing instructions 642-7. In some embodiments, code/birthday/ passcode processing instructions 642-1, facial image processing instructions 642-2, voice processing instructions 642-3, fingerprint processing functions 642-4, iris processing functions 642-5, retinal processing functions 642-6 and DNA processing instructions 642-7 may be utilized by the processor 612 or be associated with the processor 612 as one or more modules/engines to provide output information via the output device 618 and/or the transceiver device 614.

According to some embodiments, the data collected by code/birthday/passcode processing instructions 642-1, facial image processing instructions 642-2, voice processing instructions 642-3, fingerprint processing functions 642-4, iris processing functions 642-5, retinal processing functions 642-6 and DNA processing instructions 642-7 may, for example, be analyzed, sorted, filtered, decoded, decompressed, ranked, scored, plotted, and/or otherwise processed by the processor 612. In some embodiments, the collected data may be fed by the processor 612 through one or more mathematical and/or statistical formulas and/or models.

According to some embodiments, the apparatus 610 may comprise the cooling device 650. According to some embodiments, the cooling device 650 may be coupled (physically, thermally, and/or electrically) to the processor 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 610.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

Referring now to FIG. 29A, FIG. 29B, FIG. 29C, FIG. 29D, and FIG. 29E, perspective diagrams of exemplary data storage devices 740 a-e according to some embodiments are shown. The data storage devices 740 a-e may, for example, be utilized to store instructions and/or data, such as code/ birthday/passcode processing instructions 642-1, facial image processing instructions 642-2, voice processing instructions 642-3, fingerprint processing functions 642-4, iris processing functions 642-5, retinal processing functions 642-6 and DNA processing instructions 642-7, each of which is presented in reference to FIG. 28 herein. In some embodiments, instructions stored on the data storage devices 740 a-e may, when executed by a processor, cause the implementation of and/or facilitate the methods 200, 300, 550, 580 of FIGS. 2, 3, 26 and 27, respectively herein, and/or portions thereof.

According to some embodiments, the first data storage device 740 a may comprise one or more various types of internal and/or external hard drives. The first data storage device 740 a may, for example, comprise a data storage medium 746 that is read, interrogated, and/or otherwise communicatively coupled to and/or via a disk reading device 746. In some embodiments, the first data storage device 740 a and/or the data storage medium 746 may be configured to store information utilizing one or more magnetic, inductive, and/or optical means (e.g., magnetic, inductive, and/or optical-encoding). The data storage medium 746, depicted as a first data storage medium 746 a for example (e.g., breakout cross-section "A"), may comprise one or more of a polymer layer 746 a-1, a magnetic data storage layer 746 a-2, a non-magnetic layer 746 a-3, a magnetic base layer 746 a-4, a contact layer 746 a-5, and/or a substrate layer 746 a-6. According to some embodiments, a magnetic read head 746 a may be coupled and/or disposed to read data from the magnetic data storage layer 746 a-2.

In some embodiments, the data storage medium 746, depicted as a second data storage medium 746 b for example (e.g., breakout cross-section "B"), may comprise a plurality of data points 746 b-2 disposed with the second data storage medium 746 b. The data points 746 b-2 may, in some embodiments, be read and/or otherwise interfaced with via a laser-enabled read head 746 b disposed and/or coupled to direct a laser beam through the second data storage medium 746 b.

In some embodiments, the second data storage device 740 b may comprise a CD, CD-ROM, DVD, Blu-Ray™ Disc, and/or other type of optically-encoded disk and/or other storage medium that is or becomes known or practicable. In some embodiments, the third data storage device 740 c may comprise a USB keyfob, dongle, and/or other type of flash memory data storage device that is or becomes known or practicable. In some embodiments, the fourth data storage device 740 d may comprise RAM of any type, quantity, and/or configuration that is or becomes practicable and/or desirable. In some embodiments, the fourth data storage device 740 d may comprise an off-chip cache, such as a Level 2 (L2) cache memory device. According to some embodiments, the fifth data storage device 740 e may comprise an on-chip memory device, such as a Level 1 (L1) cache memory device.

The data storage devices 740 a-e may generally store program instructions, code, and/or modules that, when executed by a processing device cause a particular machine to function in accordance with one or more embodiments described herein. The data storage devices 740 a-e depicted in FIG. 29A, FIG. 29B, FIG. 29C, FIG. 29D, and FIG. 29E are representative of a class and/or subset of computer-readable media that are defined herein as "computer-readable memory" (e.g., non-transitory memory devices as opposed to transmission devices or media).

Illustrative Embodiments Including Points of Interest

1. In some illustrative embodiments, a system for enabling access of a user to multiple host services comprises a user device including a data store configured to store one or more biometric features of a user and configured to generate a unique user identifier for enabling access to an application product accessible via the user device, an interface associated with the user device, the interface configured to verify the user based on the stored one or more biometric features to enable access to the application product, a communication link associated with the user device configured to enable communication of the application product with one or more host services available on a computer network and to transmit the unique user identifier to a selected one host service of the one or more host services and one of an image or scanning engine associated with the interface of the user device, the one of an image or scanning engine configured to enter sign in indicia or code transmitted by the selected one host service to the user device or to an electronic device, to thereby enable access to services of the given host service.

2. In some illustrative embodiments, a method comprises opening an authenticator application product with a user device, creating a user account with the authenticator application product, initiating one or more authentication processes associated with the authentication application product for a user of the user device, executing the one or more authentication processes on the user with the user device and registering the user account with one or more service providers. The steps are implemented by one or more processors coupled to memory.

3. The one or more authentication processes include at least one of passcode recognition, facial recognition, voice recognition, fingerprint recognition, iris recognition, retinal recognition or DNA recognition.

4. The step of initiating one or more authentication processes includes initiating multiple ones of the one or more authentication processes.

5. The method may further include generating a unique user identifier for the user account.

6. The method may include registering the unique user identifier with the one or more service providers.

7. The method also may include accessing the one or more service providers through the authenticator application product. The step of accessing the one or more service providers includes executing one or more verification processes of the authenticator application product with the user device where the one or more verification processes corresponding to the one or more authentication processes.

8. The step of executing the one or more verification processes includes using the user device to verify the user through at least one of a passcode verification, facial verification, voice verification, fingerprint verification, iris verification, retinal verification or DNA verification.

9. The method may include selecting on the authenticator application product a given host service from the one or more host services registered with the user account.

10. The method may include receiving, from the given host service, sign in indicia or code, the sign in indicia or code being displayed on a smart device capable of executing the given host service.

11. The method may include entering, via the authenticator application product, the sign in indicia or code, with the user device.

12. The sign in indicia or code includes visual indicia and wherein entering the sign in code or indicia includes scanning the visual indicia with an imaging module of the user device. The visual indicia may include a quick response (QR) code.

13. The method may include receiving the given host service on the smart device.

14. In another illustrative embodiments, a method comprises accessing an authenticator application product with a user device, verifying through one or more verification processes a user associated with the authenticator application product, selecting a given host service from one or more host services registered with the authenticator application product, receiving, from the given host service, sign in indicia or code, the sign in indicia or code being displayed on an electronic device capable of executing the given host service, entering, via the authenticator application product, the sign in indicia or code, with the user device and accessing the given host service on the electronic device. The steps are implemented by one or more processors coupled to memory.

15. The one or more authentication processes include at least one of passcode recognition, facial recognition, voice recognition, fingerprint recognition, iris recognition, retinal recognition or DNA recognition.

16. The sign in indicia or code includes visual indicia and wherein entering the sign in code or indicia includes scanning the visual indicia with an imaging module of the user device.

17. The method may include directing a unique user identifier for the user account to the given host service to enable verification by the given HOST service of the user account.

18. In illustrative embodiments, a computer program product, tangibly stored in a non-transitory computer-readable medium and comprising computer-executable instructions, wherein when executed, the computer-executable instructions cause a device to: open an authenticator application product with a user device, create a user account with the authenticator application product, initiate one or more authentication processes associated with the authentication application product for a user of the user device, execute the one or more authentication processes on the user with the user device and register the user account with one or more service providers.

19. The one or more authentication processes include at least one of passcode recognition, facial recognition, voice recognition, fingerprint recognition, iris recognition, retinal recognition or DNA recognition.

20. In illustrative embodiments, a system is also provided including one or more of the features of the preceding points.

Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

All definitions, as defined and used herein, should be understood to control over dictionary definitions, definitions in documents incorporated by reference, and/or ordinary meanings of the defined terms. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The indefinite articles "a" and "an," as used herein in the specification and in the claims, unless clearly indicated to the contrary, should be understood to mean "at least one" or "one or more".

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, an FDA" does not imply that any or all of the three items of that list are mutually exclusive and does not imply that any or all of the three items of that list are comprehensive of any category.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

As utilized herein, the terms "program" or "computer program" may refer to one or more algorithms formatted for execution by a computer. The term "module" or "software module" refers to any number of algorithms and/or programs that are written to achieve a particular output and/or output goal—e.g., a 'login credentialing' module (or program) may provide functionality for permitting a user to login to a computer software and/or hardware resource and/or a 'shipping' module (or program) may be programmed to electronically initiate a shipment of an object via a known and/or available shipping company and/or service (e.g., FedEx®). The terms "engine" or "software engine" refer to any combination of software modules and/or algorithms that operate upon one or more inputs to define one or more outputs in an ongoing, cyclical, repetitive, and/or loop fashion. Data transformation scripts and/or algorithms that query data from a data source, transform the data, and load the transformed data into a target data repository may be termed 'data transformation engines', for example, as they repetitively operate in an iterative manner upon each row of data to produce the desired results.

Numerous embodiments are described in this patent application, and are presented for illustrative purposes only. The described embodiments are not, and are not intended to be, limiting in any sense. The presently disclosed disclosure(s) are widely applicable to numerous embodiments, as is readily apparent from the disclosure. One of ordinary skill in the art will recognize that the disclosed disclosure(s) may be practiced with various modifications and alterations, such as structural, logical, software, and electrical modifications. Although particular features of the disclosed disclosure(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present disclosure(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the disclosure, and does not imply that the illustrated process is preferred.

It will be readily apparent that the various methods and algorithms described herein may be implemented by, e.g., appropriately and/or specially-programmed computers and/or computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

The present disclosure can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or disclosures. Some of these embodiments and/or disclosures may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the disclosure as defined by the claims appended hereto.

While embodiments of the present disclosure have been particularly shown and described with reference to certain examples and features, it will be understood by one skilled in the art that various changes in detail may be effected therein without departing from the spirit and scope of the present disclosure as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A method, comprising:
    opening an authenticator application product with a user device;
    creating a user account with the authenticator application product;
    initiating multiple authentication processes associated with the authenticator application product for a user of the user device;
    executing the multiple authentication processes of the user with the user device;
    generating a unique user identifier for the user account based at least in part on the multiple authentication processes;
    registering the unique user identifier with multiple host service providers, the multiple host service providers providing different host services;
    selecting on the authenticator application product with the user device a given host service from the multiple host service providers registered with the user account, including:
        executing multiple verification processes associated with the authenticator application product for the user, the multiple verification processes corresponding to at least some of the multiple authentication processes with the user device; and
        transmitting by the authenticator application product the unique user identifier to the given host service responsive to confirmation that the multiple verification processes correspond to at least some of the multiple authentication processes;
    receiving, from the given host service, sign in indicia or code, the sign in indicia or code being displayed on a smart device capable of executing the given host service;
    entering, via the authenticator application product, the sign in indicia or code, with the user device, to access the given host service; and
    receiving the given host service on the smart device,
    wherein the steps are implemented by one or more processors coupled to memory.

2. The method according to claim 1 wherein the multiple authentication processes multiple ones of passcode recognition, facial recognition, voice recognition, fingerprint recognition, iris recognition, retinal recognition or DNA recognition.

3. The method according to claim 2 wherein executing the multiple verification processes includes using the user device to verify the user through the multiple ones of the passcode recognition, facial verification, voice verification, fingerprint verification, iris verification, retinal verification or DNA verification.

4. The method according to claim 1 wherein the sign in indicia or code includes visual indicia and wherein entering the sign in code or indicia includes scanning the visual indicia with an imaging module of the user device.

5. The method according to claim 4 wherein the visual indicia includes a quick response (QR) code.

6. The method according to claim 5 wherein the quick response (QR) code is transmitted directly from the given host service to the smart device.

7. The method according to claim 1 wherein the unique user identifier is the same for each different host service provider.

8. The method according to claim 1 wherein selecting the authenticator application product with the user device the given host service further includes displaying the multiple host service providers registered with the user account on one of a display or menu of the user device.

9. The method according to claim 8 wherein displaying the multiple host service providers occurs subsequent to executing multiple verification processes associated with the authenticator application product for the user.

10. The method according to claim 1 wherein the user device is the same as the smart device.

11. The method according to claim 1 wherein the smart device is an electronic device.

12. The method according to claim 1 wherein the smart device includes one of a TV, a smart TV, a computer, a Tablet, a laptop, a desktop, and a smart phone.

13. A computer program product, tangibly stored in a non-transitory computer-readable medium and comprising computer-executable instructions, wherein when executed, the computer-executable instructions cause a device to:
    open an authenticator application product with a user device;
    create a user account with the authenticator application product;
    initiate multiple authentication processes associated with the authenticator application product for a user of the user device;
    execute the multiple authentication processes of the user with the user device;
    generate a unique user identifier for the user account based at least in part on the multiple authentication processes;
    register the unique user identifier with multiple host service providers, the multiple host service providers providing different host services;
    select on the authenticator application product with the user device a given host service from the multiple host service providers registered with the user account, including:
        execute multiple verification processes associated with the authenticator application product for the user, the multiple verification processes corresponding to at least some of the multiple authentication processes with the user device; and
        transmit by the authenticator application product the unique user identifier to the given host service responsive to confirmation that the multiple verification processes correspond to at least some of the multiple authentication processes;
    receive, from the given host service, sign in indicia or code, the sign in indicia or code being displayed on a smart device capable of executing the given host service;
    enter, via the authenticator application product, the sign in indicia or code, with the user device, to access the given host service; and
    receive the given host service on the smart device.

14. The computer program product according to claim 13 wherein the multiple authentication processes include multiple ones of passcode recognition, facial recognition, voice recognition, fingerprint recognition, iris recognition, retinal recognition or DNA recognition.

15. The computer program product according to claim 14 wherein executing the multiple verification processes includes using the user device to verify the user through the multiple ones of the passcode recognition, facial verification, voice verification, fingerprint verification, iris verification, retinal verification or DNA verification.

16. The computer program product according to claim 13 wherein the sign in indicia or code includes visual indicia and wherein entering the sign in code or indicia includes scanning the visual indicia with an imaging module of the user device.

17. The computer program product according to claim 16 wherein the visual indicia includes a quick response (QR) code.

18. The computer program product according to claim 17 wherein the quick response (QR) code is transmitted directly from the given host service to the smart device.

19. The computer program product according to claim 13 wherein the unique user identifier is the same for each different host service provider.

20. The computer program product according to claim 13 wherein selecting the authenticator application product with the user device the given host service further includes displaying the multiple host service providers registered with the user account on one of a display or menu of the user device.

21. The computer program product according to claim 20 wherein displaying the multiple host services occurs subsequent to executing multiple verification processes associated with the authenticator application product for the user.

22. The computer program product according to claim 13 wherein the user device is the same as the smart device.

23. The computer program product according to claim 13 wherein the smart device is an electronic device.

24. The computer program product according to claim 13 wherein the smart device includes one of a TV, a smart TV, a computer, a Tablet, a laptop, a desktop, and a smart phone.

* * * * *